(12) United States Patent
Moreno et al.

(10) Patent No.: US 10,815,770 B2
(45) Date of Patent: Oct. 27, 2020

(54) METHOD AND DEVICE FOR MEASURING SURFACE DYNAMOMETER CARDS AND OPERATION DIAGNOSIS IN SUCKER-ROD PUMPED OIL WELLS

(71) Applicant: YPF TECNOLOGÍA S.A., Ciudad Autónoma de Buenos Aires (AR)

(72) Inventors: Gustavo Ariel Moreno, City Bell-Pcia. de Buenos Aires (AR); Fernando Javier Sánchez, M Gonnet Pcia. de Buenos Aires (AR); Abel Esteban Garriz, Chascomús Pcia. de Buenos Aires (AR); Marcelo Olmedo, Pcia. de Mendoza (AR)

(73) Assignee: YPF TECNOLOGIA S.A., Ciudad Autonónoma de Buenos Aires (AR)

( * ) Notice: Subject to any disclaimer, the term of this patent is extended or adjusted under 35 U.S.C. 154(b) by 0 days.

(21) Appl. No.: 15/784,504

(22) Filed: Oct. 16, 2017

(65) Prior Publication Data
US 2019/0218903 A1    Jul. 18, 2019

(30) Foreign Application Priority Data

Oct. 17, 2016   (AR) .............................. 20160103165

(51) Int. Cl.
| | | |
|---|---|---|
| *E21B 47/008* | (2012.01) | |
| *E21B 47/12* | (2012.01) | |
| *E21B 43/12* | (2006.01) | |
| *E21B 47/009* | (2012.01) | |
| *G06F 17/14* | (2006.01) | |

(52) U.S. Cl.
CPC .......... *E21B 47/008* (2020.05); *E21B 43/127* (2013.01); *E21B 47/009* (2020.05); *E21B 47/12* (2013.01); *G06F 17/141* (2013.01)

(58) Field of Classification Search
CPC ............... E21B 47/0007; E21B 43/127; E21B 47/0008; E21B 47/12; G06F 17/141
See application file for complete search history.

(56) References Cited

U.S. PATENT DOCUMENTS

| | | | |
|---|---|---|---|
| 3,343,409 A | | 9/1967 | Gibbs |
| 4,561,299 A | | 12/1985 | Orlando et al. |
| 5,090,418 A | * | 2/1992 | Squires ................ A61B 5/0464 600/515 |
| 5,182,946 A | * | 2/1993 | Boughner ............... E21B 47/00 702/6 |
| 5,406,482 A | | 4/1995 | McCoy et al. |
| 5,511,129 A | * | 4/1996 | Craven ................... H03G 5/165 381/103 |
| 6,857,474 B2 | | 2/2005 | Bramlett et al. |
| (Continued) | | | |

OTHER PUBLICATIONS

Gibbs, Predicting the Behavior of Sucker-Rod Pumping Systems, Society of Petroleum Engineers, Jul. 1963, pp. 769-778.
(Continued)

*Primary Examiner* — Herbert K Roberts
*Assistant Examiner* — John M Royston
(74) *Attorney, Agent, or Firm* — Muncy, Geissler, Olds & Lowe, P.C.

(57) ABSTRACT

Methods for the measurement of surface dynamometer cards and diagnosis of operation in sucker rod pumped oil-producing wells, as well as devices using such methods having an autonomous, compact and cost-effective design.

13 Claims, 26 Drawing Sheets

(56) References Cited

U.S. PATENT DOCUMENTS

| | | | |
|---|---|---|---|
| 9,080,438 B1 | 7/2015 | McCoy et al. | |
| 2003/0218940 A1* | 11/2003 | Jogi | G01V 11/002 367/82 |
| 2005/0155759 A1 | 7/2005 | Bramlett et al. | |
| 2011/0185825 A1 | 8/2011 | Mackie | |
| 2015/0176395 A1* | 6/2015 | McCoy | E21B 47/0007 702/6 |
| 2017/0363079 A1* | 12/2017 | Baker | F04B 49/065 |

OTHER PUBLICATIONS

Takacs, Sucker-Rod Pumping Handbook, May 8, 2015, pp. 489-490.

Gibbs and Neely, Computer Diagnosis of Down-Hole Conditions in Sucker Rod Pumping Wells, Journal of Petroleum Technology, Jan. 1966, pp. 91-98.

Everitt and Jennings, An Improved Finite-Difference Calculation of Downhole Dynamomter Cards for Sucker-Rod Pumps, SPE Production Engineering, Feb. 1992, pp. 121-127.

* cited by examiner

METHOD AND DEVICE FOR MEASURING SURFACE DYNAMOMETER CARDS AND OPERATION DIAGNOSIS IN SUCKER-ROD PUMPED OIL WELLS

FIELD OF THE INVENTION

The present invention relates to a method for automatically diagnosing the operation of a pump in an oil-producing well. In particular, the present invention relates to the measurement of surface dynamometer cards and to the diagnosis of operation in sucker-rod pumped oil-producing wells, as well as to devices using said method, that have an autonomous, compact and economical design.

BACKGROUND OF THE INVENTION

In an oil production process, "well controller" is the equipment used to automatically monitor and control the operation of the pumping apparatus in order to optimize the operation of a downhole pump.

The basic principles of measurement and operation of well control equipment were proposed by Sam Gibbs and are described in U.S. Pat. No. 3,343,409. This equipment has been widely used and progressively improved, incorporating new functionalities. In the particular case of wells using a sucker-rod pump, incorporation of the calculation of the downhole dynamometer card has shown relevant. This calculation involves the resolution of a wave equation with a dissipation term to model the elastic propagation of stresses from downhole to the ground surface (S. G. Gibbs. *Predicting the Behavior of Sucker-Rod Pumping Systems*, Journal of Petroleum Technology 15 issue 07 (1963), SPE-588-PA). This allowed the interpretation of the operating status of the pump downhole from measurements at the surface, as well as obtaining valuable information on the dynamics of the pump. The pump dynamics information is generally represented in a "dynamometer card", which is a parametric plot over time that represents force as a function of the position of the polished rod. The shape of this plot allows possibly the detection of pump failures (G. Takacs, *Sucker-Rod Pumping Handbook*, Gulf Professional Publishing, 2015).

The controllers basing their actions on dynamometer cards must necessarily use a force transducer and a position transducer, since these variables are related to the boundary conditions that are necessary to solve the Gibbs equation in the so-called "diagnostic mode" (see e.g. S. G. Gibbs and A. B. Neely. *Computer Diagnosis of Down-Hole Conditions In Sucker Rod Pumping Wells*. SPE-1165-PA, Journal of Petroleum Technology 18 (1) (1966) or T. A. Everitt and J. W. Jennings, *An Improved Finite-Difference Calculation of Downhole Dynamometer Cards for Sucker-Rod Pumps*, SPE-18189-PA, SPE Production Engineering 7 (1) (1992)).

There are multiple devices to measure the force and position of the polished-rod of a sucker-rod pump apparatus. Force transducers used to measure the strain performed by the polished rod are generally based on a Wheatstone bridge load cell, where one or more branches have a resistance that varies proportionally with the deformation to the load on the cell ("strain gauges") as described for example in the patent application US 2011/0185825 A1. The resistive bridge then generates an analogic signal in the mV/V order, typically 2 mV/V, proportional to the load on the transducer. This signal is amplified and digitized to be used by another electronic module.

The position of the polished rod can be measured using an encoder, an inclinometer as described in U.S. Pat. No. 4,561,299, an accelerometer used on the cell as indicated in U.S. Pat. No. 5,406,482, or an ultrasonic position sensor, among others. In all cases, the transducer generates an output signal that, when processed, allows to infer the position of the polished rod as a function of time using a clock synchronized with the load cell.

The acceleration of the polished rod measured by an accelerometer has an offset that must be compensated, since these devices generally do not have an accurate factory calibration. For this reason, in prior art inventions, such as the one described in U.S. Pat. No. 5,406,482, said offset must be subtracted from the acceleration measurements. From the acceleration measurement, velocity can be obtained by numerical integration of the acceleration over several cycles and adjusting to a straight line that uses the peaks (maximums) as reference to subtract the linear component.

Generally, sensor data is transmitted analogically or digitally, with cables or wirelessly to a processing unit capable of storing them—permanently or temporarily—and calculating the downhole card, implementing a numerical method that solves Gibbs' equation.

In U.S. Pat. No. 6,857,474 and in patent application US 2005/0155759 the use of the result of this calculation is contemplated to obtain a diagnosis of the state in that unit, although the algorithms capable of performing this task are not specified. Furthermore, it is not demonstrated that the diagnostic algorithms used are suitable computing means to be installed in a well.

U.S. Pat. No. 9,080,438 B1 refers to a system for monitoring the operation of a pump during the extraction of a fluid, which operates in conjunction with a central computer. In the computer there is a software to process the data and obtain a dynamometer card of the pump operation.

The system claimed in U.S. Pat. No. 9,080,438 B1 requires a computer that receives data from a load cell and from the accelerometer for further processing. In fact, there are also commercial devices that implement this system, processing the data in a controller that wirelessly receives measurements from a load cell that contains a built-in accelerometer (Bright Automation™). Advantageously, in the invention described herein, the data is processed in the same device that contains the load cell, opening the possibility of calculating the status of the pump and transmitting in case of occurrence of events (detection of failures), or transmitting measurements at a much lower rate. Since the data is already processed in situ, that is to say in the same instrument that contains all the sensors, they can be sent in segments or packets in a low bandwidth system (such as LoRA, Sigfox, or other communication systems characteristic of Internet of the things) at a greater distance from the device.

As the study of the state of the art for the monitoring of sucker-rod pumps reveals, the measurements are made in one or more devices that transmit the data to another device that calculates the downhole dynamometer card, and then in some cases act with some control loop on the operational parameters. The communication between the different devices necessary to perform the measurement of the dynamometer card must be wired or wireless in the well location. The presence of more than one device is inconvenient and expensive.

The use of an accelerometer allows to perform the position transduction economically and to integrate the sensor into the load cell, but prior art devices require the use of additional computing units, such as a laptop, in order to process the information. Therefore, there is a need to provide acceleration measurement methods that allow processing the data in the device, as well as integrally solving the problem of mechanical pumping monitoring by means of a single device with all the functionalities simultaneously.

SUMMARY OF THE INVENTION

The present specification describes methods and algorithms to acquire, process and analyze the above referred data in a single device, generating as a final result the dynamometric measurement of a well and diagnosis that can be delivered to a remote point.

The device described herein is focused on the measurement and diagnosis of the state of a well, and can be combined with a control loop that acts on the variables of the system. The device of the present invention is more practical and economical in its application to oil exploitation since it is extremely simple to install and maintain, in addition to requiring a minimum of communication because of the autonomous evaluation of the information generated by the sensors. Unlike other systems in the state of the art, the device of the present invention is not only capable of transmitting raw information (unprocessed) but it is capable of calculating the downhole card, allowing then the report of data only in case of detection of anomalous events (improving energy consumption), or transmitting that data in small packets typical of narrow band transmissions (allowing to reach a greater distance to the receiving node).

The advantage of the present invention over other devices with similar functionalities of the prior art is that the acquisition and analysis methods make it possible concentrating all the functionalities in a single device and administering them with a single cost-effective microcontroller processor. In this way, the present invention provides a more compact, robust and economical solution than commercial devices currently available or other devices in the prior art.

Accordingly, in a first aspect, it is an object of the invention a method to perform measurements, diagnose the operation and evaluate the performance of a pumping system of an oil well comprising a pump rod linked to a reciprocating unit, wherein the method comprises the following steps:
a) determining an operating characteristic of the pumping system at the surface;
b) determining said operating characteristic of the pumping system downhole based on the operating characteristic of the pumping system at the surface; and
c) obtaining an operation diagnosis of the pumping system based on the characteristics of the pumping system at the surface and downhole,
wherein step a) of determining the operating characteristic of the pumping system at the surface comprises the steps of:
aa) determining at least one force cycle on the rod;
ab) determining the rod oscillation period based on the force cycle determined in aa); and
ac) determining the rod position as a function of time by the following steps:
i. obtaining a rod acceleration signal and simultaneously obtaining the Fourier transform, from the time domain to the frequency domain, of the rod acceleration signal, with at least the first order coefficient of the Fourier series expansion of the transformed signal of the rod acceleration from said acceleration signal and the rod oscillation period determined in step ab),
ii. dividing the Fourier coefficient/s determined in i) by the square of its/their index, which is equivalent to integrating twice the signal in time domain, and obtaining a new transformed signal proportional to the transformed position; and
iii. anti-transforming the new transformed signal obtained in ii) and obtaining the rod position as a function of time.

In a preferred embodiment of the invention, the Fourier coefficients of the acceleration and the position are obtained in step ac) i) from the rod acceleration signal and the simultaneous obtaining of the Fourier transform, from the time domain to the frequency domain, of the rod acceleration signal, with at least the first order coefficient of the Fourier series expansion of the transformed signal of the rod acceleration from said acceleration signal and the rod oscillation period determined in step ab).

In a preferred embodiment of the invention, in step ac) i) between 5 and 7 coefficients of the Fourier series expansion are used.

In a yet more preferred embodiment of the invention, in step ac) i) 7 coefficients of the Fourier series expansion are used.

The position of the polished rod as a function of time is approximately sinusoidal, but it contains higher order harmonics that depend on the pumping device kinematics. When truncating the expansion in series, the truncation error is amplified when decreasing the number of terms that are used to represent the signal. This is why a single Fourier coefficient gives an approximate solution but with considerable error; by retaining more coefficients the representation is of higher quality. With 7 Fourier coefficients the truncation error is negligible for the dynamometric application.

In a preferred embodiment of the invention, in step ac) i) said acceleration signal is produced by an accelerometer and the coefficient calculation of said expansion is performed for each acceleration value obtained from said signal.

In another preferred embodiment of the invention, said operating characteristic is a dynamometer card.

In yet another preferred embodiment of the invention, in step ac) i) in the Fourier series expansion of the transformed signal of the polished rod acceleration the calculation of the zero order coefficient is omitted.

In yet another preferred embodiment of the invention, the position of the polished rod as a function of time is rescaled with the stroke length of the polished rod.

In a second aspect of the present invention, the Fourier coefficients of the acceleration and the position are calculated through analog filters and integrators.

In an embodiment of this second aspect of the invention, the acceleration is measured analogically, this signal is filtered analogically or digitally with a band-pass filter and then integrated twice with an analog circuit, obtaining the rod position as a function of time.

In an even more preferred embodiment of this second aspect of the present invention, the Fourier coefficients of acceleration and position are calculated through analog filters and integrators from data from an analogic accelerometer.

In still another preferred embodiment of this second aspect of the invention, the position is measured by means of a position sensor, this being an ultrasonic, infrared, or laser sensor, or based on another principle, such as by image processing.

In a third aspect, the present invention provides a device for diagnosing the operation of a pumping system of an oil well comprising a pump rod linked to a reciprocating unit, where said device comprises, in a single housing or enclosure, at least one data acquisition unit, at least a power supply system and at least one processing unit.

In a preferred embodiment of this third aspect of the present invention, the power supply system of the equipment is based on an energy accumulator, such as non-rechargeable batteries, rechargeable batteries by means of solar panels, ultra-capacitors with solar panels or other means that is powered externally or not by a generator such as a solar panel, piezoelectric generators, other power supplying means that take energy from the environment or a wired power supply means from an external source of energy.

In a preferred embodiment of the device of the present invention, said processing unit:

a) determines a dynamometer card of the pumping system at the surface;

b) determines a dynamometer card of the pumping system downhole based on the dynamometer card of the pumping system at the surface; and c) obtains an operation diagnosis of the pumping system based on the dynamometer cards of the pumping system at the surface and downhole, where to determine a dynamometer card of the pumping system at the surface, the processing unit:

aa) determines at least one force cycle on the rod;

ab) determines the period of oscillation of the rod based on the force cycle determined in aa);

ac) determines the position of the rod as a function of time by the following steps:

i) obtaining a polished rod acceleration signal and simultaneously obtaining the Fourier transform, from the time domain to the frequency domain, of the polished rod acceleration signal, with at least the first order coefficient of the Fourier series expansion of the transformed signal of the polished rod acceleration, from said acceleration signal and the polished rod oscillation period determined in step ab), ii) dividing the Fourier coefficient/s determined in i) by the square of its/their index, which is equivalent to integrating twice the signal in the time domain, and obtaining a new transformed signal proportional to the transformed position; and iii) anti-transforming the new transformed signal obtained in ii) and obtaining the rod position as a function of time.

In a preferred embodiment of this aspect of the invention, the calculation of the zero-order coefficient is omitted in the Fourier series expansion of the transformed signal of the rod acceleration.

In still another preferred embodiment of this aspect of the invention, the rod position as a function of time is rescaled with the stroke length thereof.

In yet another preferred embodiment of this aspect of the invention, between 5 and 7 Fourier coefficients are used, more preferably 7.

In a preferred embodiment of this aspect of the invention, the data acquisition unit comprises a force transducer or load cell.

In still another preferred embodiment of this aspect of the invention, the data acquisition unit comprises a position transducer.

In an even more preferred form of the invention, said device further comprises a unit for wirelessly transmitting processed and/or raw data to a remote unit. Said data is communicated wirelessly to a data collection point, e.g. an access node to a SCADA system.

BRIEF DESCRIPTIONS OF THE DRAWINGS

Figure 7A:
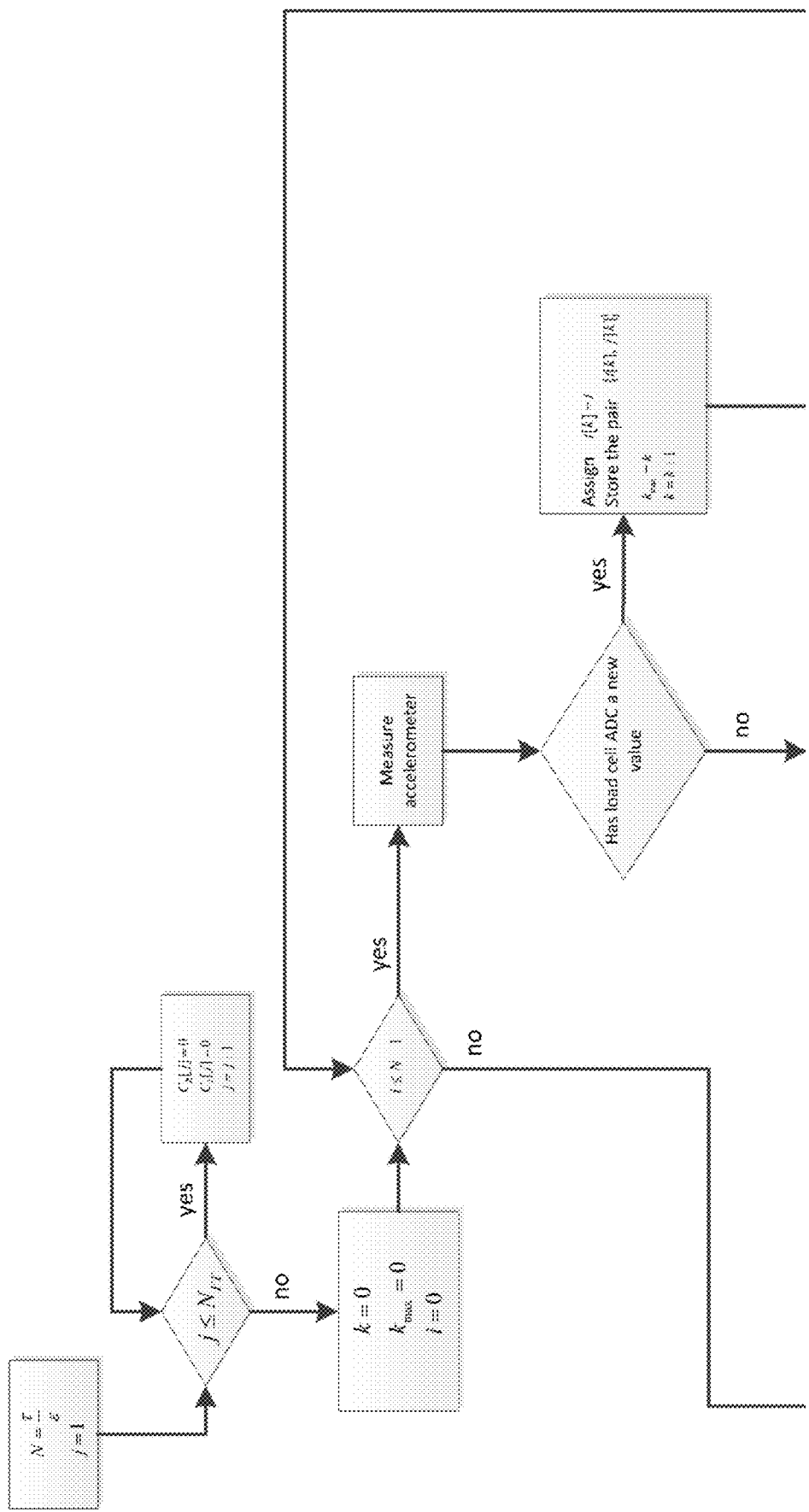
FIGS. 7A and 7B show a block diagram representing the calculation algorithm of step E3 as described hereinafter.
Figure 7B:
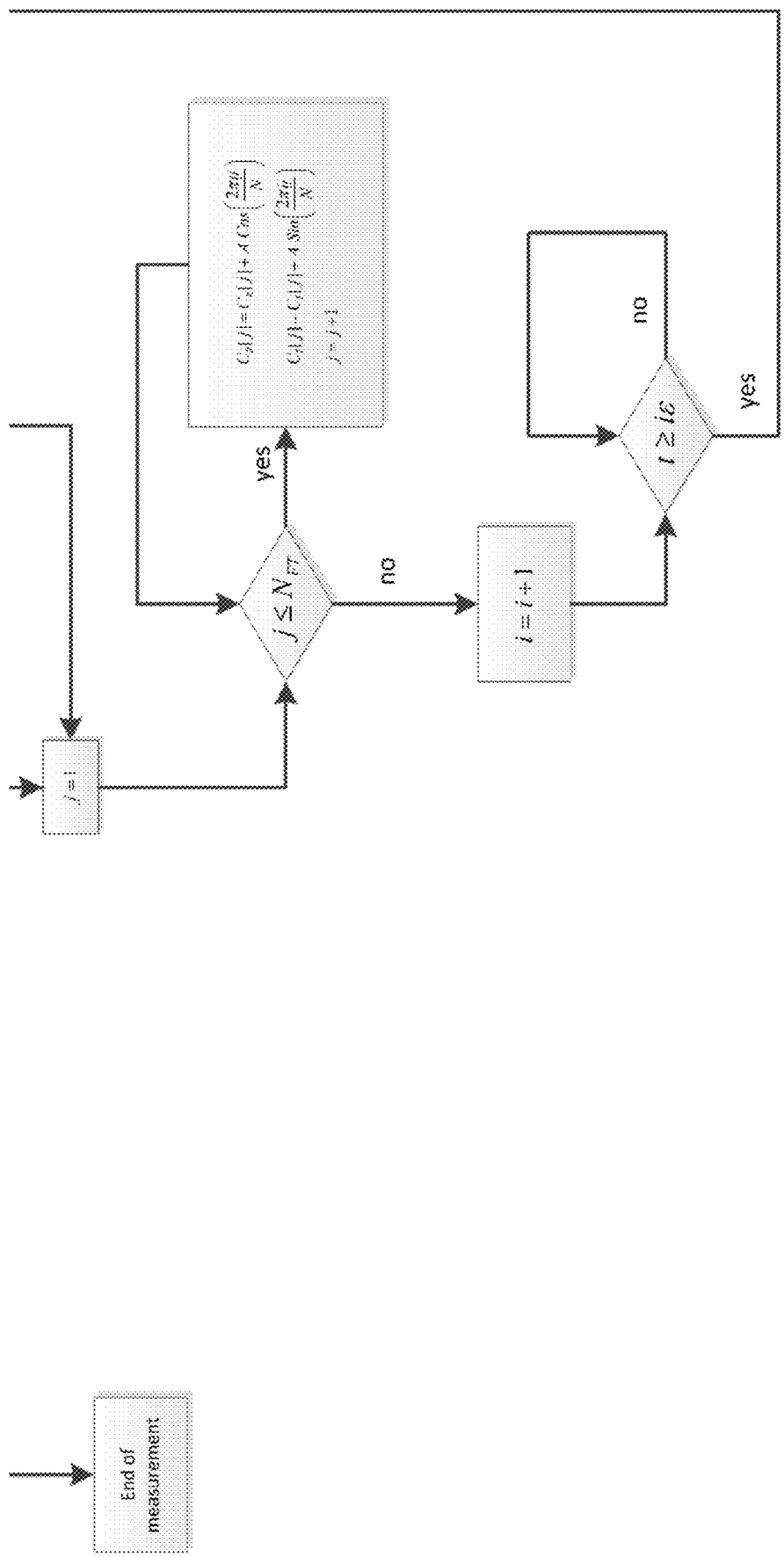
Figure 15:
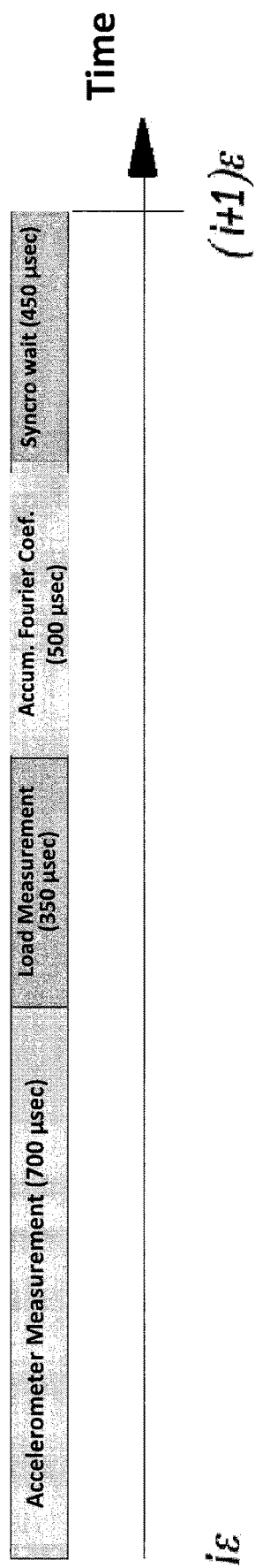

FIG. 15 shows the execution time of each task within the main measurement loop associated with FIG. 7. The times for the accelerometer and digital analog converter of the load cell (load measurement) correspond to the communication time. The conversion that takes place in the digital analog converter occurs in parallel and is only transmitted to the microcontroller when the same is ready (that is, strictly, the measurements are performed in parallel in each sensor and the referred measurement times correspond to the communication between the peripherals and the microcontroller).

Figure 16:
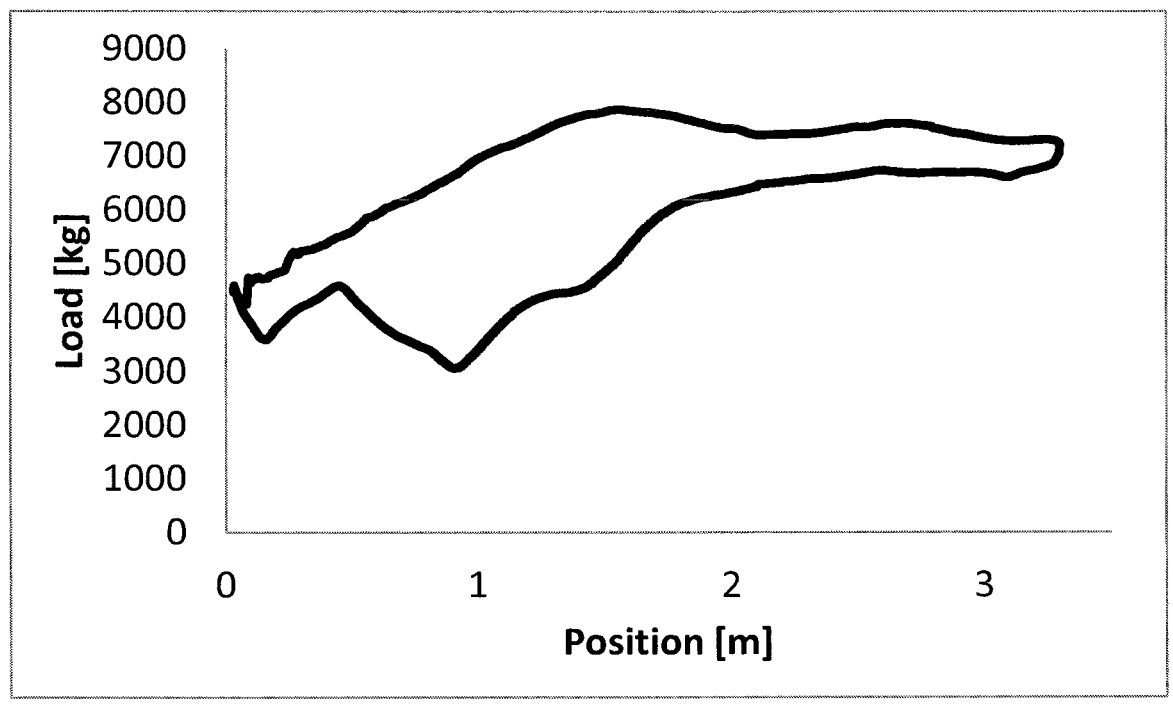

FIG. 16 shows a surface dynamometer card obtained according to embodiments of the methods and devices of the present invention.

Figure 17:
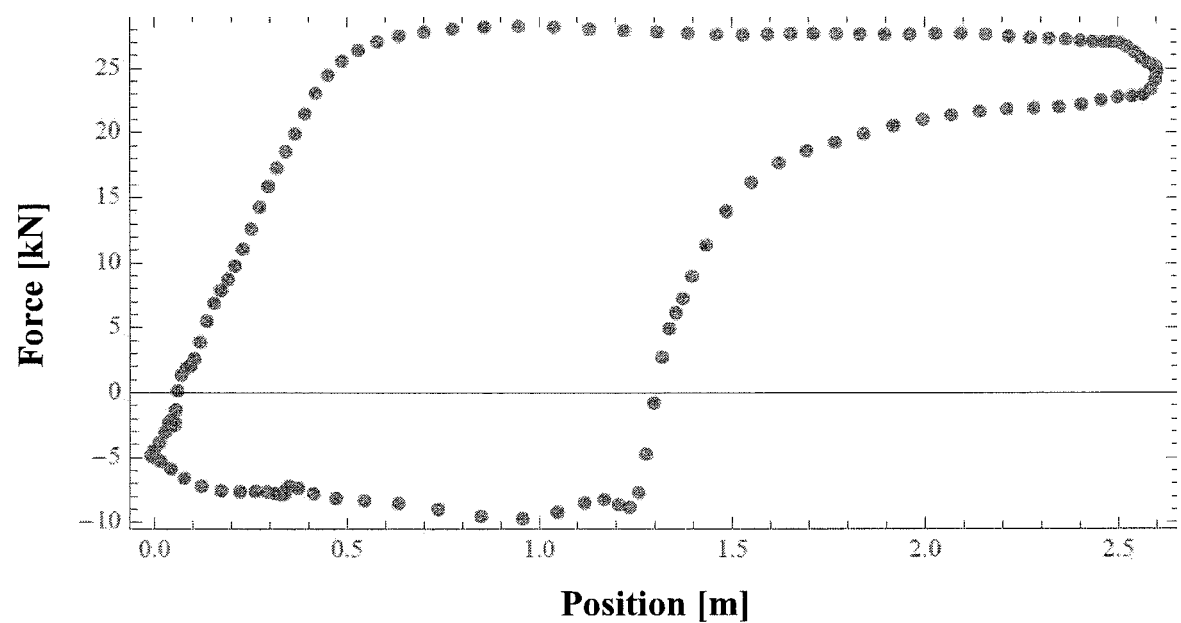

FIG. 17 shows a downhole dynamometer card obtained according to embodiments of the methods and devices of the present invention.

FIGS. 18A-18D show: a downhole dynamometer card normalized to the interval [0,1] (18A); a downhole dynamometer card with equispaced points (18B); a downhole dynamometer card after applying a low-pass filter (18C); a downhole dynamometer card where the anchor displacement or tubing without anchor displacement (18D) was corrected, obtained by means of the methods and devices of the present invention.

Figure 19B:
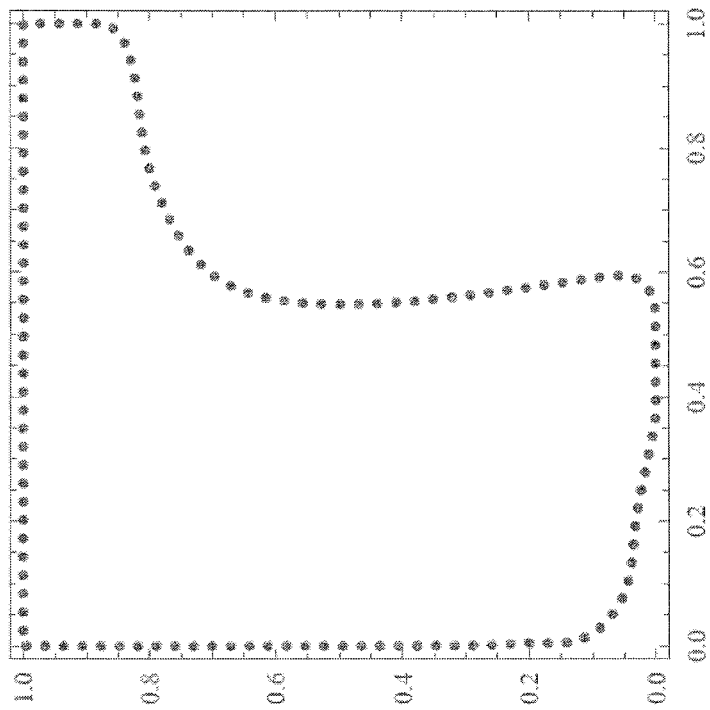
Figure 19A:

FIGS. 19A and 19B show: the upper branch of a downhole dynamometer card (19A); the lower branch of a downhole dynamometer card (19B) obtained using the methods and devices of the present invention.

Figure 20B:
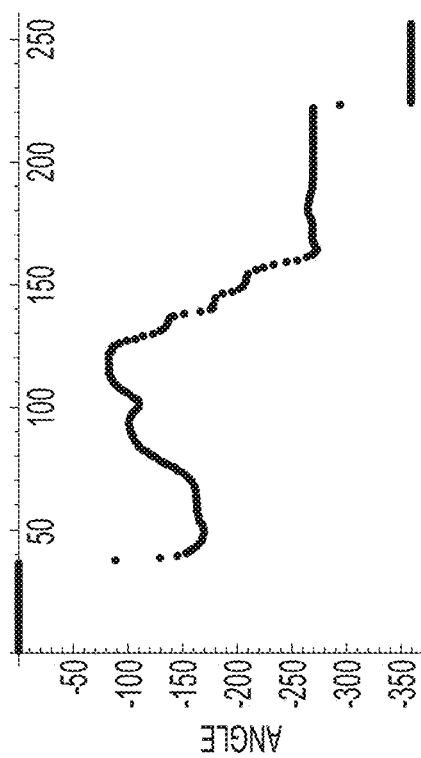
Figure 20A:
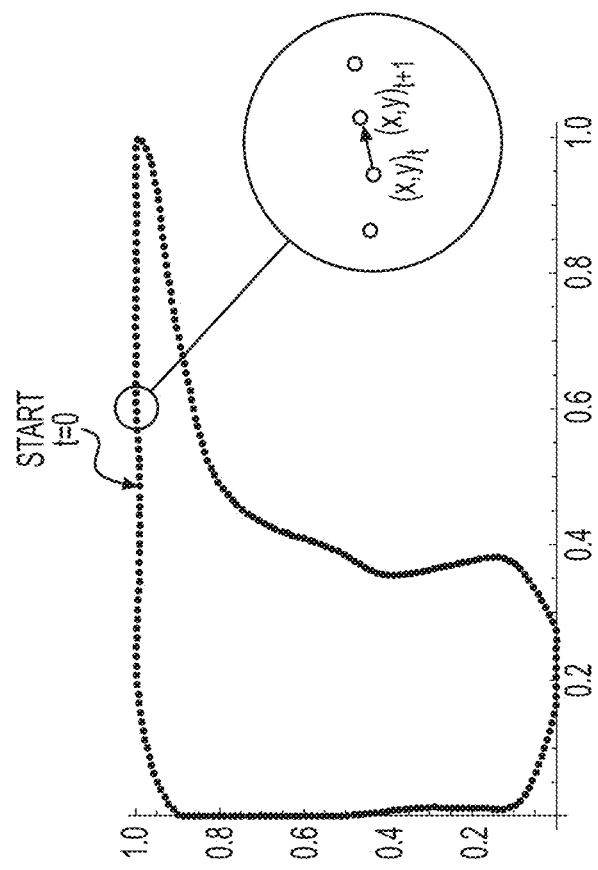

FIGS. 20A and 20B show a vector defined between contiguous points of a dynamometer card (20A) and the series of angles of each vector (20B).

Figure 21A:
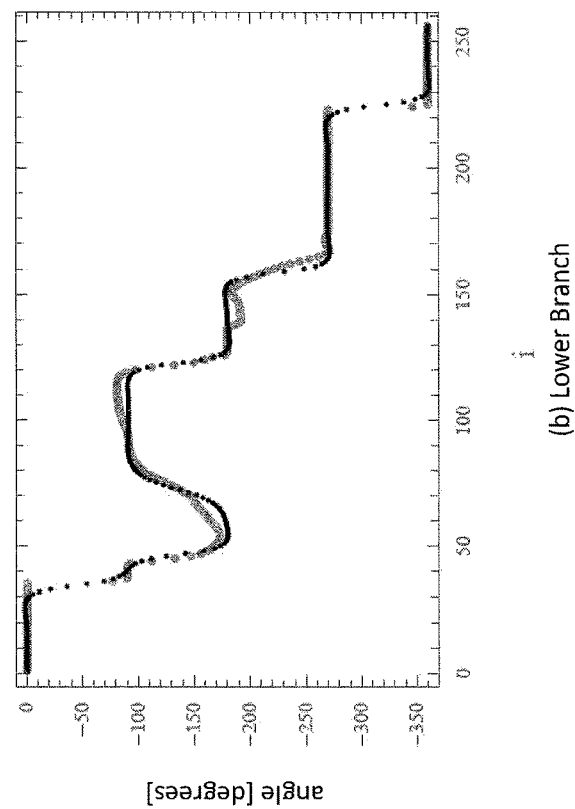
Figure 21B:
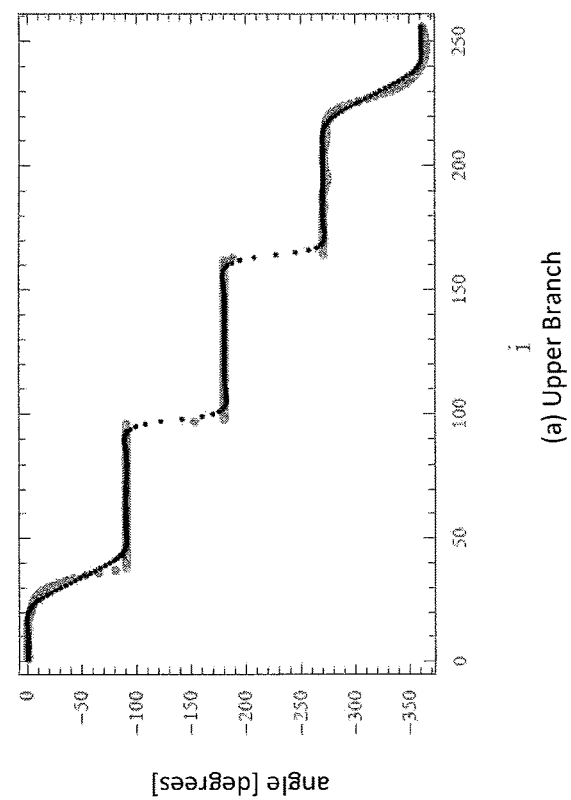

FIGS. 21A and 21B show the angular series of the upper branch (21A) and the lower branch (21B) for the dynamometer cards obtained using the methods and devices of the present invention according to an exemplary embodiment. The measured and processed points are shown in black; and the angular series of the closest pattern card is shown in gray.

Figure 22:
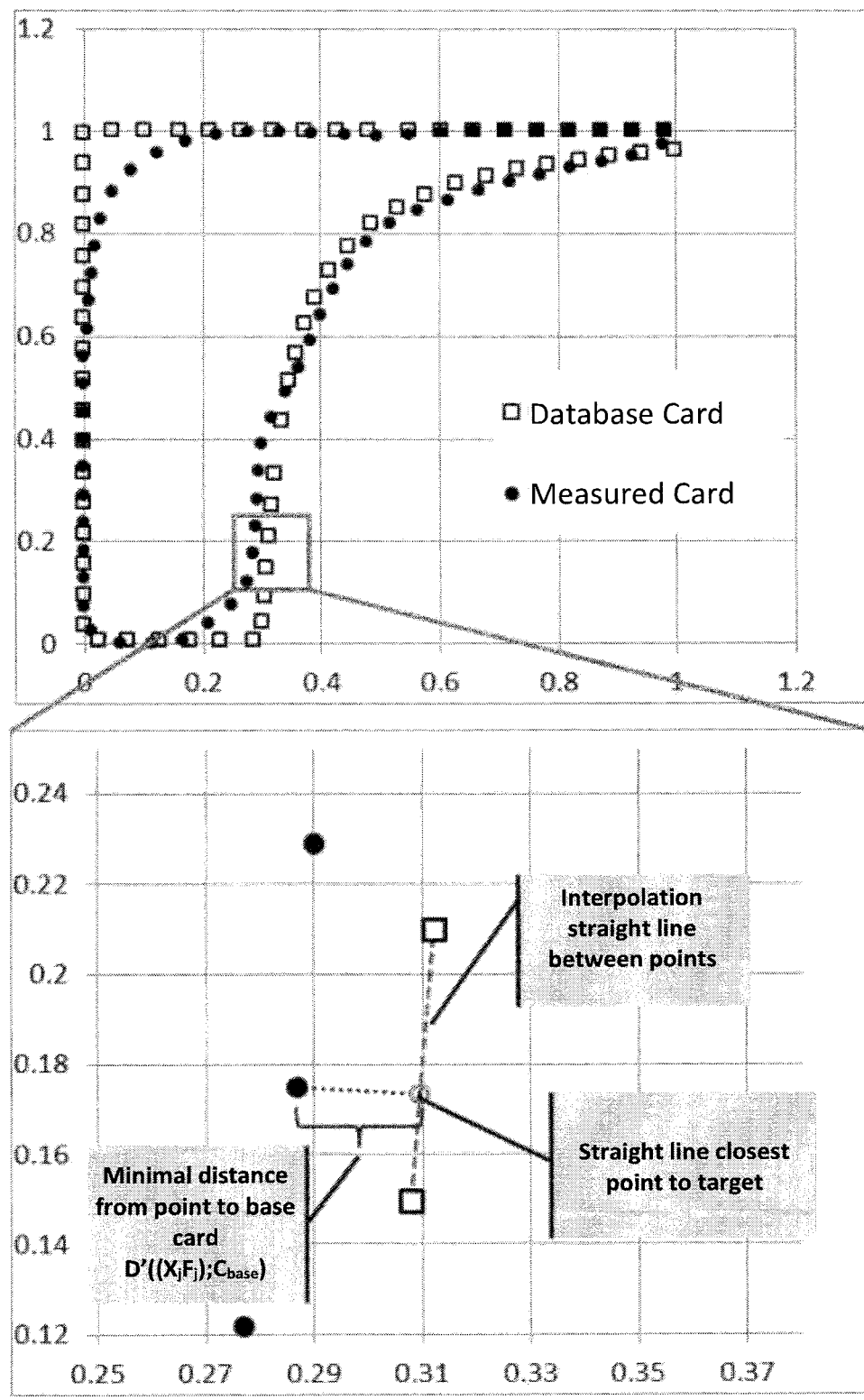

FIG. 22 shows the NN search according to the Euclidean method, where the distance between the target and a base element is obtained by adding the Euclidean distances between each point of the target and the polygonal approximation of the standard card.

DETAILED DESCRIPTION OF THE INVENTION

In the present application, the term sucker rod pump (SRP) refers to a mechanical pumping equipment used in the oil production wells, comprising a motor, a gearbox and a force transmitting unit that by means of periodic oscillatory movements allow pulling a rod string to drive a pump downhole.

The term "card", or alternatively the term "dynamometer card" refers to a graphical representation of the force at a point in the rod string as a function of its position with time as a parameter. The dynamometer card can be "at the surface" or "downhole" depending on whether it corresponds to the strains on the polished rod (surface card) or on the pump downhole (downhole card).

Due to its cyclical nature, the dynamometer card forms a closed curve. The expression "upper branch" designates the set of upper points of said curve, which in general corresponds to the upstroke.

The expression "lower branch" designates the set of lower points of the curve that generally corresponds to the downstroke.

Both the upper and lower branches will be defined in greater detail in the description of the Exemplary embodiments.

The expression "plunger tagging" refers to the hit or stroke made by the pump against the upper or lower seat when it is near the top or bottom dead center. The plunger tagging is caused by inadequate spacing between the rod and the crosshead that connects it mechanically to the SRP.

The term "fluid pound" refers to the hit or stroke that the pump plunger makes against the fluid when the barrel has been incompletely filled and the mobile valve has not been opened at the beginning of the downward stroke.

The term "signal" designates a physical quantity measured by a sensor in the time domain. The expression "transformed signal" is used to designate the series of data resulting from a mathematical transformation applied to a signal, more specifically, herein a Fourier transform. For the purposes of the present invention, the coefficients of the Fourier series expansion of a transformed signal will henceforth be indistinctly designated "Fourier coefficients" or "coefficients".

The present invention comprises a method of processing and analysis that allows the dynamometric measurement and diagnosis of a sucker-rod pumped oil producing well to be integrated in a single device. In order to obtain the surface dynamometer card, which is the starting point of the analysis, an accelerometer and a load cell are used in the preferred embodiment of the present invention. The proposed measurement and processing algorithm simultaneously solves several problems present in prior art devices.

As indicated above, the acceleration measurement methods available in the prior art have the drawback of offset elimination, or the need of transmitting data to another device capable of processing them. On the contrary, according to the present invention, the acquisition, processing and remote transmission of data are carried out in the same unit. This expands the possibilities of analysis in the device, allows restricted transmission to events that are calculated in situ, increases the options for selecting transmission modules including those of narrow band, enables a much more compact design for a control unit, etc. among other benefits.

The method of the present invention is based on the calculation of the acceleration discrete Fourier transform from the measurements of the accelerometer, but without retaining in memory each individual value recorded by the sensor. This allows minimizing the use of memory in the device, directly discarding the coefficient of zero order corresponding to the offset, and also allows integrating the signal twice in a simple way. This is achieved by dividing by minus the square of the frequency, each term in the Fourier series expansion representing the acceleration to obtain a new transformed signal proportional to the rod position. The method allows saving memory, since after updating the value of the partial sum that represents the Fourier coefficients, the raw data of acceleration can be discarded. In this way, only a limited amount of coefficients is retained in memory, which allows characterizing the signal by measuring at high speed but without requiring intensive memory use.

Therefore, the algorithm employed in the present invention allows measuring the Fourier coefficients of acceleration, eliminating offsets corresponding to the components of zero order in the frequency and high frequency components of orders greater than an arbitrary value in the same process, while the data is being acquired. By eliminating the high frequency components of the spectrum, the scheme proposed herein to measure the polished rod displacement becomes insensitive to electromagnetic or mechanical noise, for example vibrations due to mounting or "shocks" in the rod string. As will be shown later, the scheme can be applied just by guaranteeing a linear response between the real acceleration and the accelerometer signal. Thus, the method is also insensitive to flaws in alignment of the integrated circuits in the mainboard containing the electronics, which provides great robustness.

In order to carry out the measurement, the device of the present invention first determines the system period by using the signal of the load cell as reference and then it measures the position by integrating the acceleration twice, simultaneously measuring the force on the pump rod. The integration is carried out on the fly, that is, by directly calculating the Fourier coefficients of the acceleration as the data is being obtained from the accelerometer. Said coefficients can be calculated in this way since the value of the movement period is known, since it was calculated previously from the previous measurement based on the load cell reading.

With the surface dynamometer card and the information of the underground installation, the device calculates the downhole dynamometer card. This card is analyzed by a recognition process capable of distinguishing local properties, such as plunger tagging, and global ones, such as gas interference.

From the downhole card processing, a series of labels is obtained that allow the identification of more than one fault at a time (for example: plunger tagging and fluid pound).

The raw and/or processed data and/or the results of the analysis can be sent to a remote point entirely (for example: diagnosis and surface and downhole cards) or partially (only diagnosis) depending on the diagnosis calculated by the system. The data can be sent continuously, periodically, upon the detection of an event (for example, positive diagnosis of a fault), or a combination of these schemes. The data can also be stored in the same device using a memory module or sent by wire or wirelessly to another point, for example with a GPRS module, or by a connection to a local display system such as a screen, display, tablet, handheld, or cell phone so that they can be visualized directly around the well's location.

The present invention will be described in detail below, with reference to the figures and specifying the calculation methods.

Figure 1A:
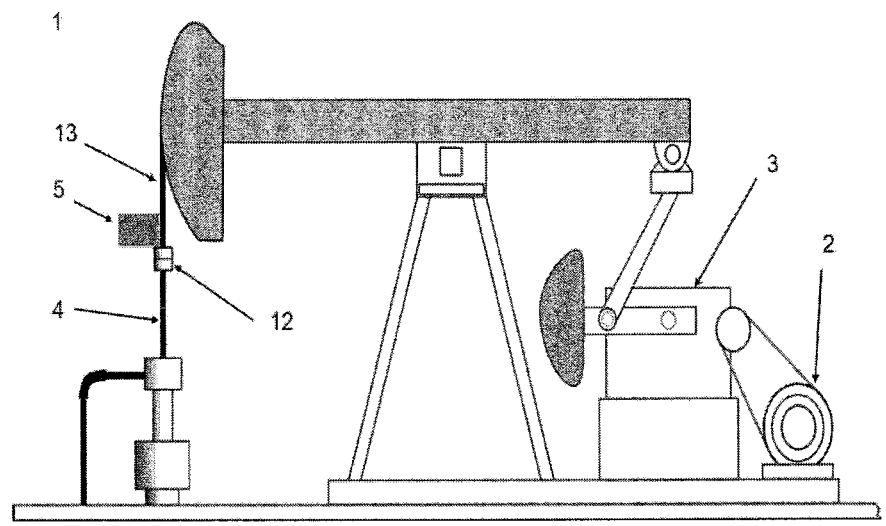
FIGS. 1A and 1B show an embodiment of a device of the present invention assembled on a rod pulling an individual pumping apparatus.
Figure 1B:
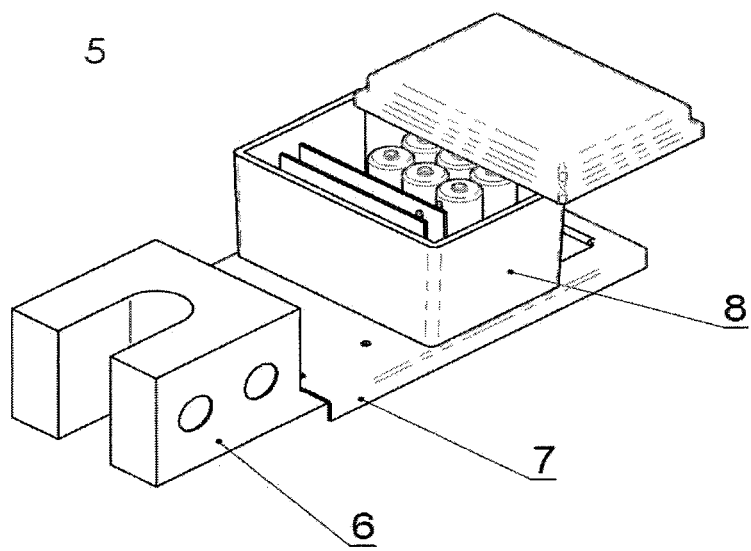
Figure 2A:
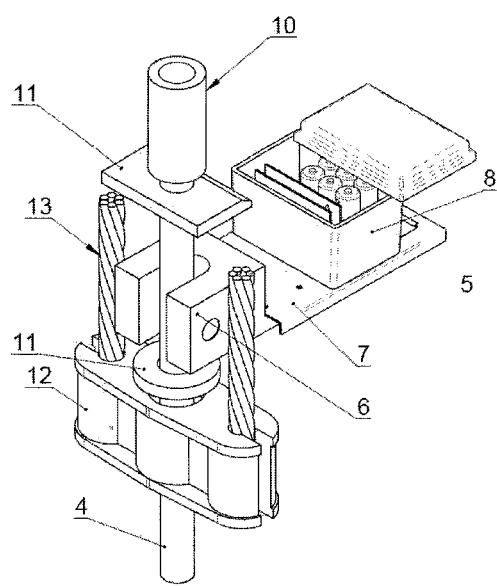
FIGS. 2A and 2B show a perspective view of a device of the present invention comprising a load cell and a housing for the electronics.
Figure 2B:
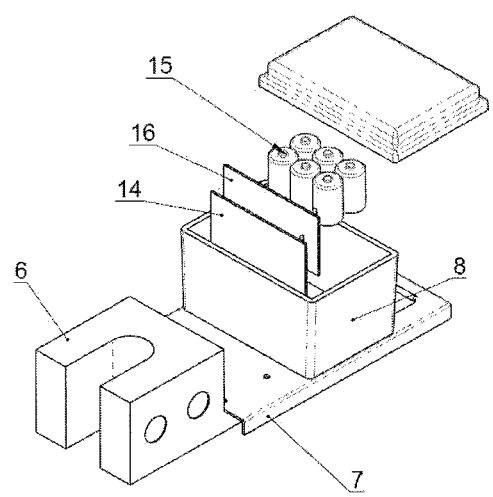
Figure 3:
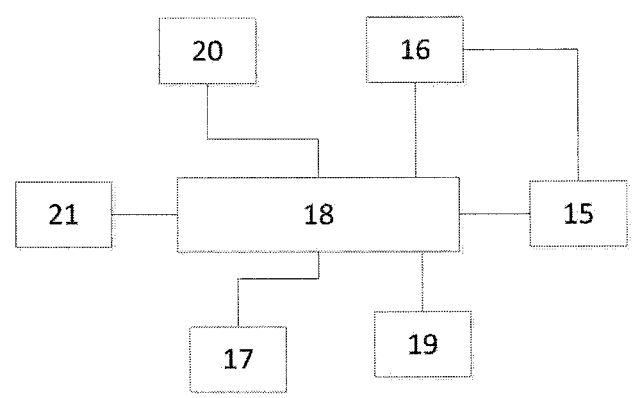
FIG. 3 shows a diagram with the electronic components of a mainboard according to an embodiment of the device of the present invention.

FIGS. 1A and 2A show a device 5 according to an embodiment of the present invention mounted around a rod 4, between spacers 11, on a crosshead 12, in an individual pump unit 1. In said device, as also shown in FIGS. 1B and 2B and in the block diagram of interaction between the modules shown in FIG. 3, a load cell 6 is fixed to a metal plate 7 which holds an explosion-proof cabinet 8. As seen in FIG. 2B, inside said cabinet 8 there is an electronic board 14 with the main components of the system that are linked to each other as shown in FIG. 3: an amplifier and analog-digital converter (ADC) 19 of the cell, such as DIY HX711 or an equivalent one, an accelerometer 17, such as ADXL 345, a microcontroller 18, such as Atmel SAM3X8E ARM Cortex-M3 CPU and the corresponding electronics for its operation, a communication module 16 such as XBee PRO 900 HP (XBP9B-DMWT-002), and a SD memory 21 for storing a copy of the data. In addition, the transmission antenna for the communication module and the batteries 15 are housed inside the cabinet 8.

Figure 4:
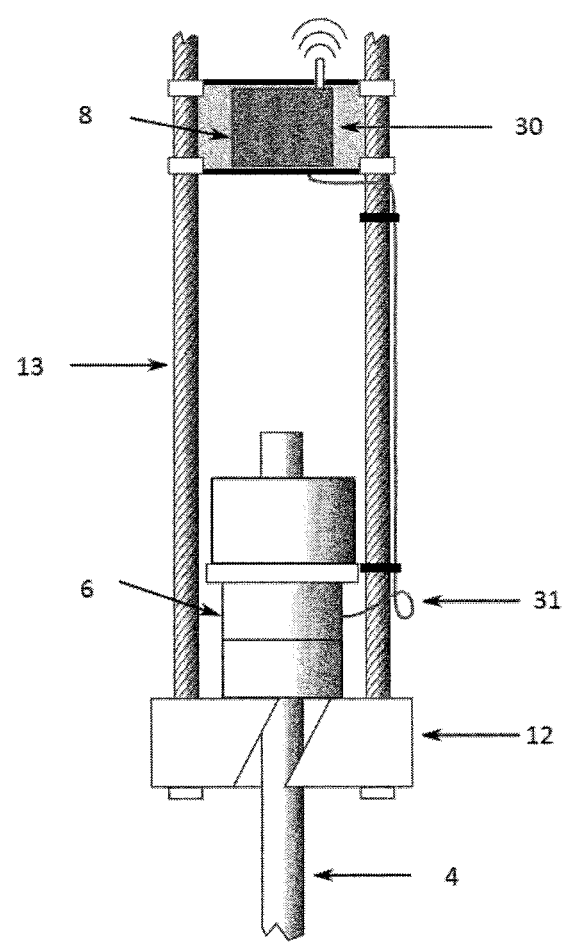
FIG. 4 shows another embodiment of the device of the present invention.

FIG. 4 shows an alternative embodiment of the device of the present invention. It is possible to replace the explosion-proof cabinet 8 with another one with IP65 degree of protection attached to the strobes 13, leaving the ZONE 1 according to ANSI/API RP 505-1998, making the load cell 6 a simple device. In this configuration, the cabinet with the electronics can be attached to a fixing plate 30 and the latter screwed to respective strobes 13. The load cell 6 is connected to the main board through a cable 31 that can also be attached to the strobes 13.

Figure 5A:
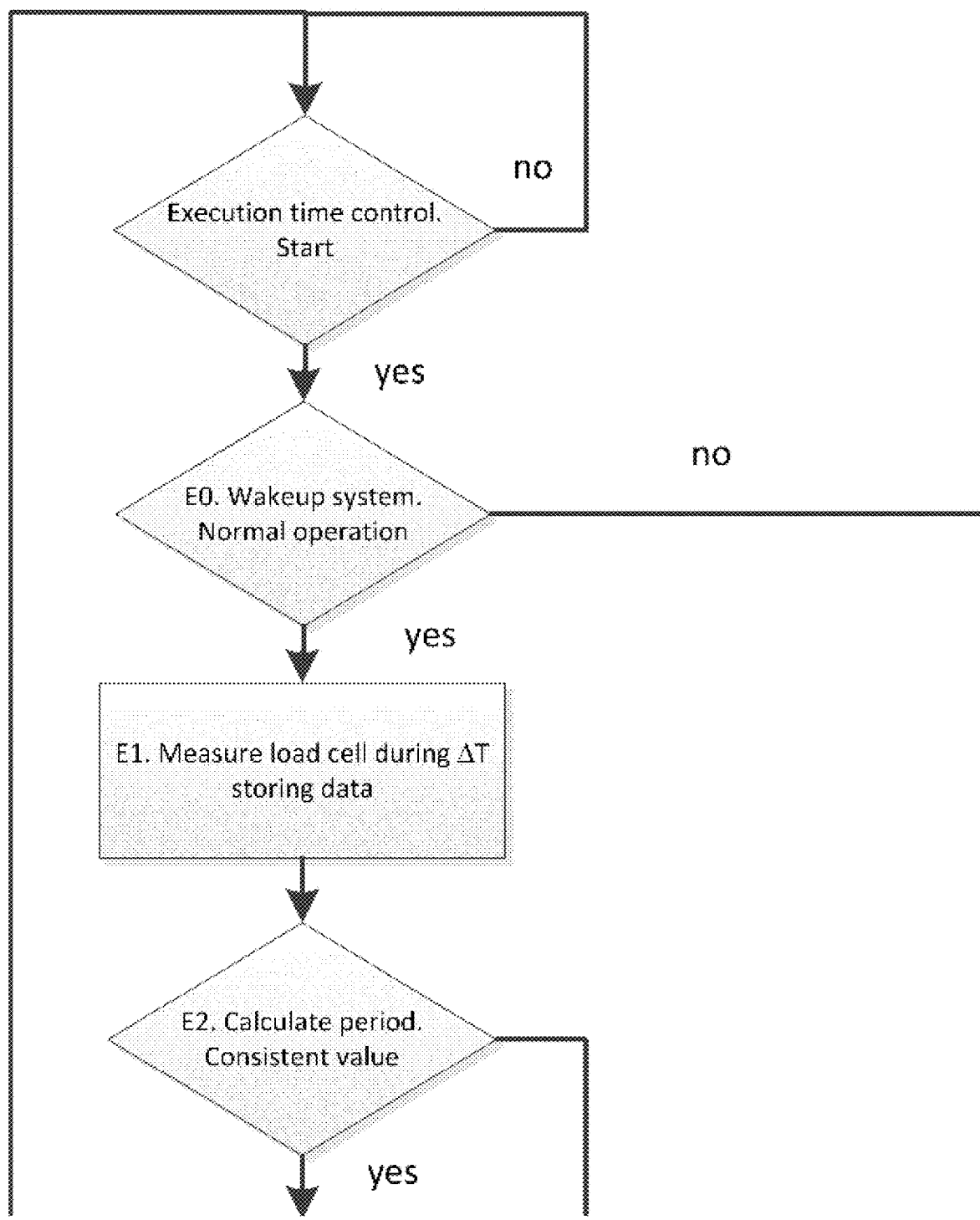
FIGS. 5A and 5B show a block diagram representing the firmware flow and the steps involved in the measurement and processing of the data according to an embodiment of the method of the present invention.
Figure 5B:
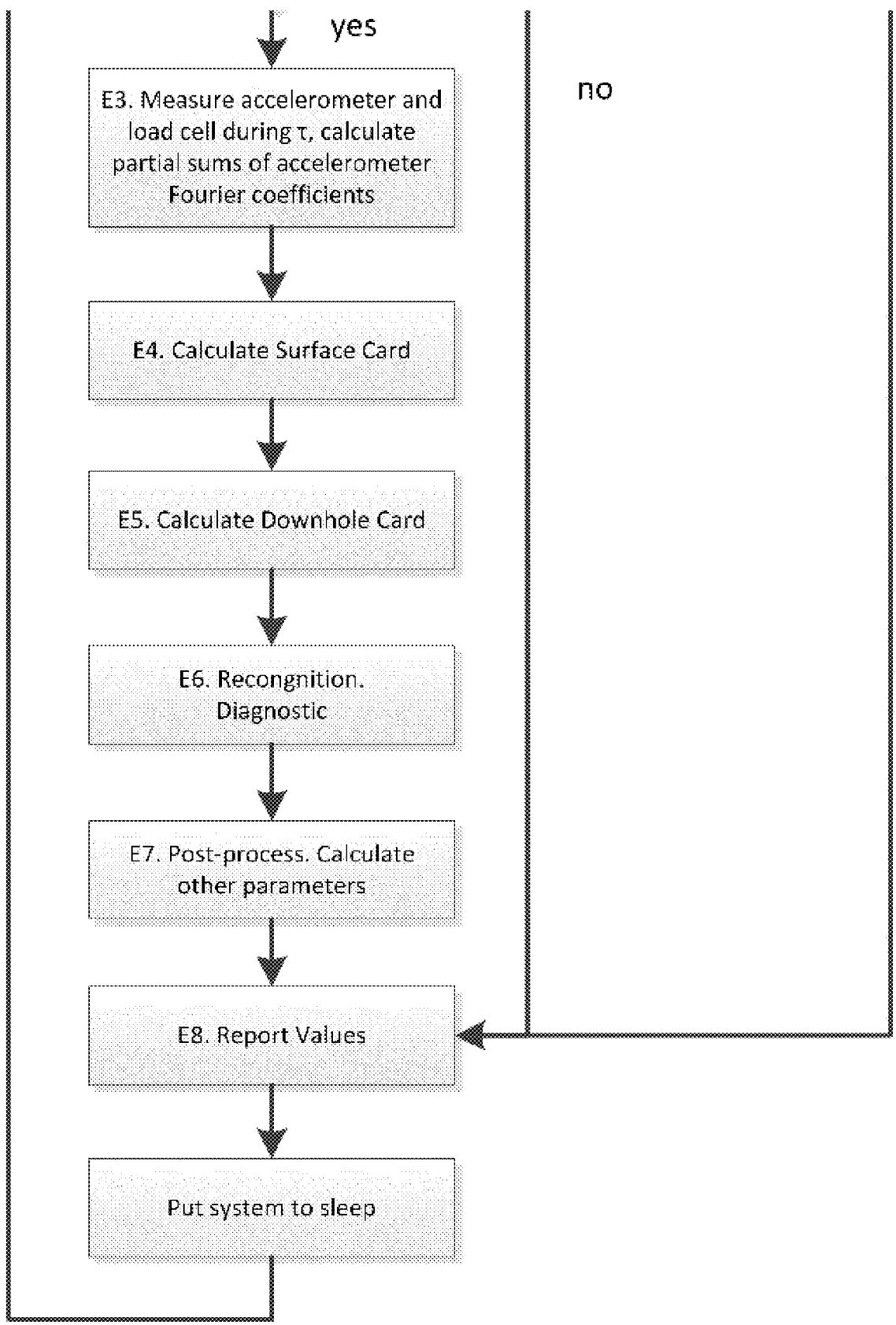

In FIG. 5 the flow diagram of the complete calculation method incorporated in the device of FIG. 1 is schematically represented. The different steps of the calculation method are carried out and administered in the same microcontroller.

In step E0, the system periodically checks if a measurement must be executed. In the affirmative case, the system controls the peripherals status. Except when in the measurement and reporting phases, the device is entirely in "low consumption" mode.

When the system "wakes up", it performs a primary measurement, stage E1, of the load cell for a fixed time, for example 30 seconds, at a relatively low sampling frequency, for example 80 samples per second (SPS), retaining the corresponding values in a memory, such as the RAM memory of the system.

If no error occurs, the data is then analyzed in step E2, when the signal period is detected. If the detected period is consistent, that is to say if, for example, it is found within an admissible operating range, such as between 4 and 15 seconds, associated with the range of 15-4 strokes per minute (SPM), progress is made towards the stage E3, where the value of the calculated period is used to measure acceleration and simultaneously calculate the Fourier coefficients of the acceleration. This step, which is described in FIG. 7, consists of a loop in which force and acceleration are measured simultaneously for a system period. The number of data that must be measured is known a priori, since the time between measurements is established as a configuration parameter. In a preferred embodiment of the invention, said time is short, for example 2 msec. In this step, each new acceleration data is used to update the value of the partial sum of the previously calculated coefficients in the same loop, when there is a new force value, which is updated only at 80 SPS, the same is stored in a memory, such as the RAM memory of the microcontroller, along with the time associated with that new value.

At the end of step E3, the value of the most significant Fourier coefficients of the polished rod acceleration is made available. In a preferred embodiment of the invention, it is sufficient to take 7 Fourier coefficients and their conjugates.

Figure 8A:
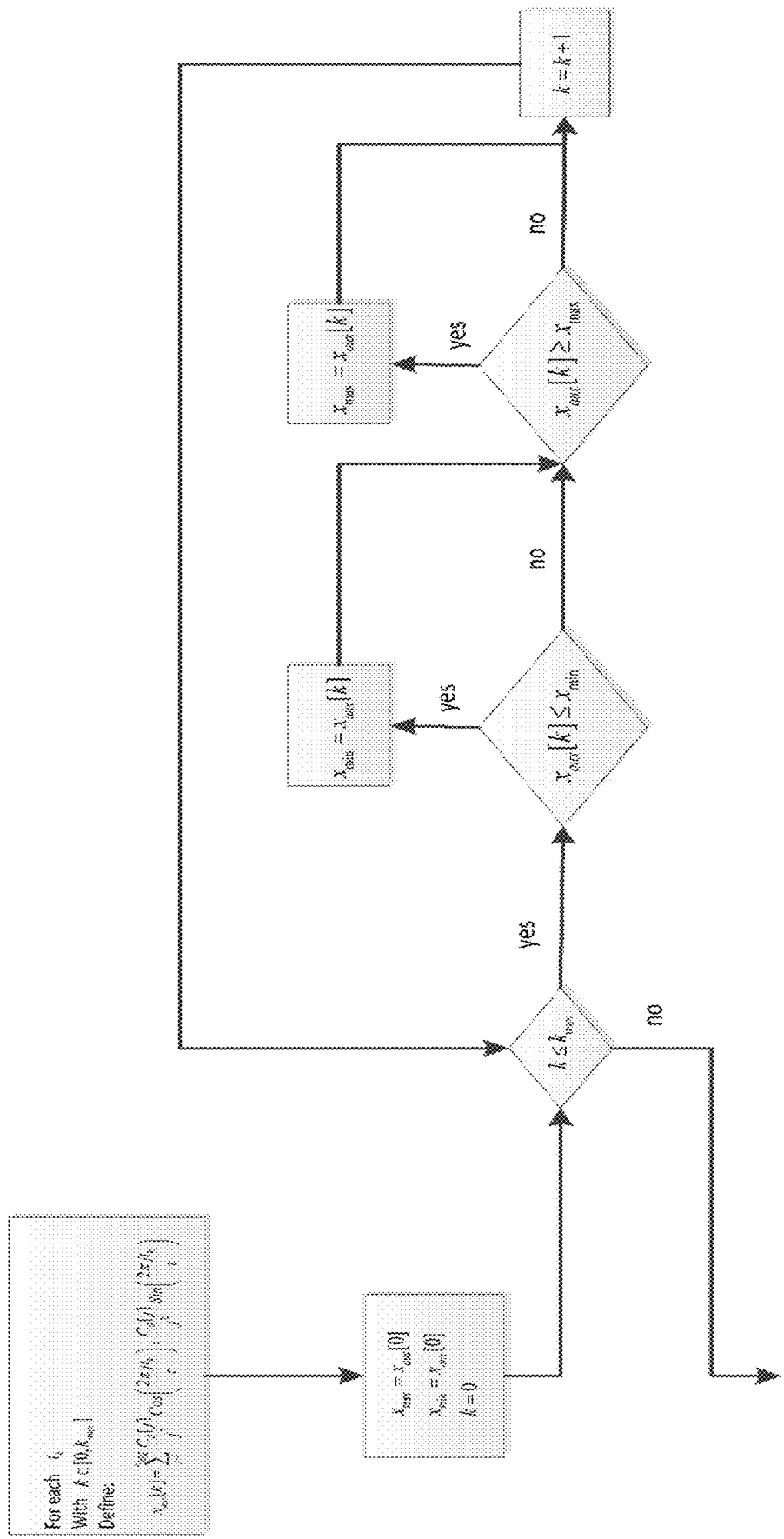
FIGS. 8A and 8B show a block diagram representing the calculation algorithm of step E4 as described hereinafter.
Figure 8B:
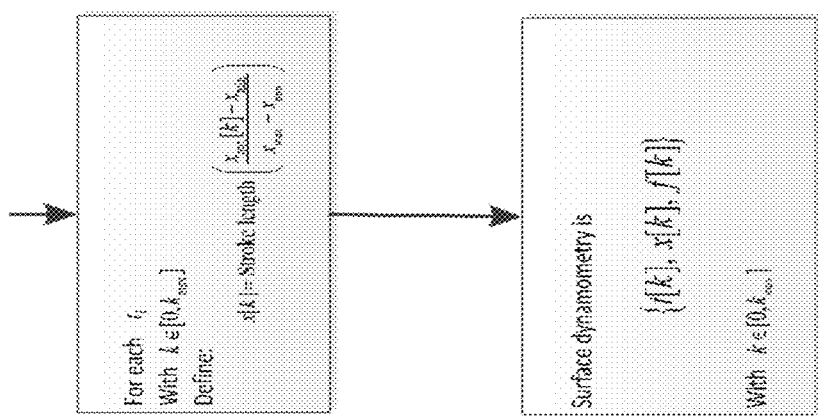

These coefficients are used in step E4, which is represented in FIG. 8, to calculate the positions associated to each instant of time in which a force data was measured. In a preferred embodiment of the invention, 1 position data is calculated every 12.5 msec, since generally the ADCs for Wheatstone bridge-type load cells operate at a frequency of 80 SPS.

In step E5 the downhole card is calculated from the surface data and information data of the rod string. In E5, the boundary condition is propagated from the surface to downhole, that is, the Gibbs equation is solved in "diagnostic mode". In the case of vertical wells, the solution can be obtained by the Fourier method, calculating the discrete Fourier transforms by fast transformation algorithms, and by a finite difference method in the case of deviated wells.

The downhole dynamometer card is processed in step E6 to obtain a series of labels associated with the operation and possible failures of the pump. The result can be a simple or multiple diagnosis. For example, it is possible to obtain a "full pump" result, corresponding to a good operation, or a presence of multiple simultaneous faults result, such as "plunger tagging and fluid pound".

Using partial information from step E6, other parameters relevant to the production operation engineer, such as the percentage of pump filling, are also estimated in step E7.

Finally, in step E8 the data are reported, possibly stored in a memory or sent to some port with telemetry, for example a radio module in a preferred embodiment of the present invention.

In the following, each of the stages embedded in the device of the present invention, corresponding to the blocks of the diagram of FIG. 5, is described in more detail.

Step E0

The microcontroller monitors the clock in real time and the schedule to define when to carry out a measurement. When this happens, a verification of all components is carried out. In case of finding errors, it reports them. Otherwise, it proceeds with the equipment standard measurement. The parameters required in the other steps, such as the configuration of the rod string, are stored in a flash memory when the device is de-energized. The parameters are read and retained in the RAM memory when the system is energized.

Step E1

The objective of this step is to obtain a reference signal for the calculation of the SRP movement period.

For a predetermined fixed time ΔT, for example 30 seconds (ΔT=30 sec), the system measures the load cell at a relatively low frequency, for example 80 SPS.

The signal resulting from this measurement is subsequently used as a reference signal to calculate the SRP movement period in step E2. Said signal must be such that it contains at least one movement period.

The measurement time of this signal limits the minimum amount of detectable SPM. In this case, should it be set at 30 sec, the minimum amount of detectable SPM will be (1/τ) 2 SPM, where τ is the motion period. Typically, this minimum amount does not impose any significant restrictions, since equipment in this industry operates at a higher speed. Although setting longer times does not impose restrictions, since there is usually enough memory available, by using a shorter measurement time the energy consumption of the system can be minimized.

According to the user selection, it is possible to set that the system only considers a range close to the last taken measurement, without the need to search in all the available range. For example, if 6 SPMs were measured in the last measurement stored in the system memory, the system can limit the search for periods to the frequency range [3,9] SPMs. The width of the interval, in this case ±3 SPMs with respect to the last measurement, is arbitrary, but is predetermined by the user.

Step E2

The objective of this step is to calculate the period of motion τ from the reference signal obtained in step E1.

This step consists of two sub-steps. In a first sub-step, a portion of the signal containing N periods is extracted, where N is an integer. For this purpose, the excess of a non-integer number of periods is cut out from the reference signal obtained in step E1. In a second sub-step, the number of periods in the first extraction is calculated. This method is much more robust than a simple count of passes through a fixed signal level and allows to process periodic arbitrary force signals.

To segment the N periods in the first sub-step, an exhaustive partition of the signal is considered. For each possible time $t^*$ the average distance between the signal in the interval $(0, t^*)$ and the signal shifted to the interval $(t^*, q)$ in the time axis is determined, where q is the minimum between $2t^*$ and ΔT, where ΔT is the width of the entire time interval.

Figure 6A:
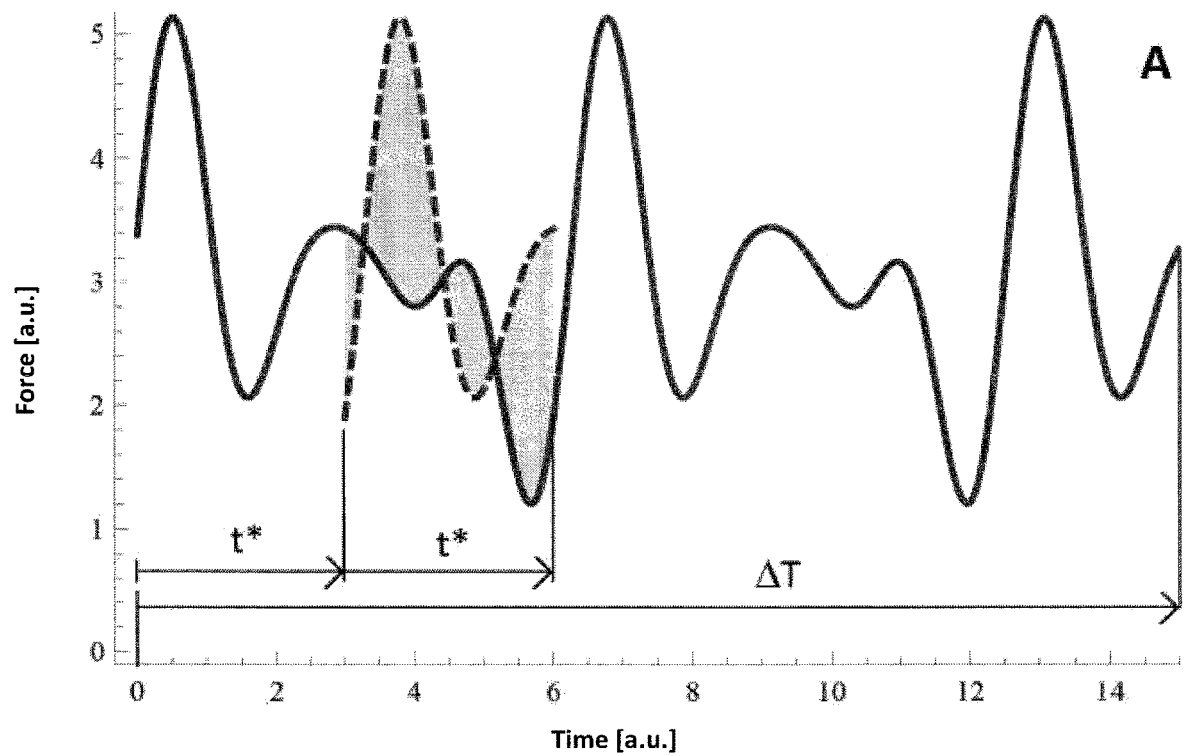
FIGS. 6A and 6B show a graphical representation of force versus time for a typical measurement of duration $\Delta T$ according to an embodiment of the method of the present invention. The time t* indicates the segmentation point for overlapping the signal and detecting an integer number of periods.
Figure 6B:
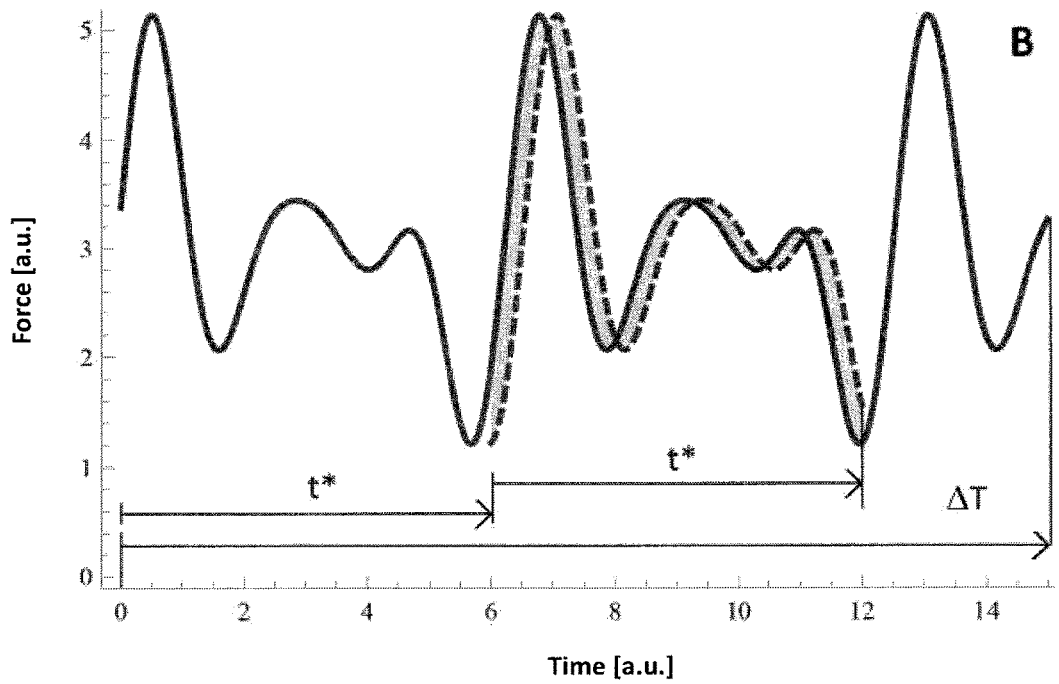

The distance between the signal segments is calculated as the average of the distances, i.e., the absolute value of the difference of the distances point to point. The average distance is taken since the number of points available for comparison varies with the variation of $t^*$. This distance globally represents the deviation in the overlap of both time segments. If $t^*$ does not coincide with the signal period, or with any of the multiples thereof, the average value of the absolute error will be high, as shown in FIG. 6A. As $t^*$ approaches a multiple of the period, as shown in FIG. 6B, the partition "fits" correctly and the average error has a clear minimum.

Considering the possible values of $t^*$ and selecting the one that minimizes the average error, it is possible to segment an integer number of periods. To avoid numerical errors due to the lack of significant data, it is usually convenient to impose a minimum on $t^*$. This restriction is not limiting, since the periods are always sought within a range. For conventional pumping devices, said range varies preferably between 4 and 15 SPMs.

To calculate the number N of periods that have been segmented in the first sub-step, in the second sub-step the first non-zero coefficient of the Fourier series expansion (FSE) of the segmented signal is calculated. The index of this coefficient corresponds to the number of periods in the extraction. It is known that the first nontrivial coefficient of the FSE, in case of corresponding to the $q^{th}$ harmonic, indicates that the true fundamental period is $t^*/q$, since if a signal is τ-periodic it is also $q^*\tau$-periodic, but all the coefficients of the FSE that are not multiples of q, are zero. To find said first non-zero coefficient, the first M harmonics or modes are calculated, for example M=12, the FSE coefficient with the maximum absolute value is determined, and the first non-zero coefficient is defined as the one that exceeds a certain threshold value above a reference level calculated from this maximum value. In the preferred embodiment of the method of the invention, said threshold value is 25% of the maximum.

If the first sub-step were not performed, the signal would be contaminated and lower order harmonics could be excited, preventing a correct counting of the number of periods.

The proposed algorithm is not limited to the case of the force signal of an SRP and can be applied in other areas for period extraction of arbitrary signal that contains at least one period of some process of interest.

The step E2 thus defined allows finding the period τ of an arbitrary set of data, truncated at any time of the measurement, with high immunity to signal noise or structure.

Step E3

The objective of this stage is to simultaneously determine the coefficients of the FSE of the polished rod acceleration and load driven by the SRP.

The position of the polished rod will then be inferred in step E4 from the FSE coefficients of the acceleration, which are calculated as the data is being measured. To this end, during the time of one period τ the acceleration and the load of the rod are measured at regular time intervals of width ε, proceeding as follows:

Define N=τ/ε

For j=1 up to j=$N_{FT}$ (inclusive), where $N_{FT}$ is the maximum number of FSE coefficients, set $C_R[j]=0$ $C_I[j]=0$ Where $C_R$ and $C_I$ are arrays where the $j^{th}$ components thereof correspond to the $j^{th}$ Fourier coefficients in real and imaginary parts respectively.

Define a data counter k for the load cell, set k=0.

For i=0 up to i=N−1 (inclusive):

Obtain the value of the accelerometer signal A.

Verify new data in load cell. If there is a new data of the ADC of the load cell, store in memory the force and time corresponding to this new data $\{t_k, F_k\}$ and update the counter value k=k+1.

If there is no new ADC data from the load cell, continue with the next step,

For j=1 up to j=$N_{FT}$ (inclusive), set $$C_R[j] = C_R[j] + A \cos\left(\frac{2\pi ij}{N}\right)$$

-continued $$C_I[j] = C_I[j] + A \sin\left(\frac{2\pi ij}{N}\right)$$

Wait until the next measurement in a time t≥iε
End step.

This step allows calculating the FSE coefficients of the acceleration signal by measuring at very high frequency, but without the need of storing all the information for further processing. That is, this step makes an "on the fly" determination of the FSE coefficients.

At the end of step E3, the measurement during time τ is made available, the times and values of the load cell at low frequency, such as 80 SPS, have been stored in memory, and also the main FSE coefficients $N_{FT}$ of the acceleration signal that correspond to the low frequency component of the polished rod motion have been stored in memory. With this data, it is possible to easily calculate the rod position associated with each load measurement in the next step E4.

FIG. 7 shows a flow chart with the steps of step E3.

Step E4

The objectives of this step are the determination of the polished rod position as a function of time and the calculation of the surface dynamometer card based on the rod acceleration, force and time data obtained in step E3.

In this process, the measured and stored into memory values $\{t_k, F_k\}$ in step E3, and the FSE coefficient arrays $C_R$, $C_I$ are taken to calculate the surface dynamometry. To determine the position, it is only necessary to perform a Fourier inverse transform. To this end, for example, a fast Fourier transform algorithm can be used. In the case where the FSE is truncated retaining only a few terms, for example 7 terms, the inverse transform can be calculated directly. To perform said calculation, an auxiliary transformed signal $x_{aux}[k]$ defined by the following equation is defined for each time instant where a load cell measurement is available:

$$x_{aux}[k] = \sum_{j=1}^{N_{FT}} \frac{C_R[j]}{j^2}\cos\left(\frac{2\pi j t_k}{\tau}\right) + \frac{C_I[j]}{j^2}\sin\left(\frac{2\pi j t_k}{\tau}\right)$$

This variable is proportional to the position at the time $t_k$. To calculate the associated position, the total stroke length of the polished rod, which is a conventional parameter, is used as the single calibration parameter. To obtain the rod position as a function of time, the minimum and maximum of the auxiliary transformed signal $x_{aux}[k]$ are calculated and then the signal is rescaled to obtain the position. These steps are performed as follows.

For all measurement times $t_k$, the values of $x_{aux}[k]$ are analyzed determining the minimum and maximum $x_{min}$=min $\{x_{aux}[k]\}$
$x_{max}$=max $\{x_{max}[k]\}$ The polished rod position x[k] can be calculated by means of the rescaling:

$$x[k] = \text{Stroke length}\left(\frac{x_{aux}[k] - x_{min}}{x_{max} - x_{min}}\right)$$

The anti-transform signal $x(t_k)$=x[k] is the polished rod position as a function of time defined so that its value varies in the range [0, Stroke length], since the Fourier coefficient associated with the zero mode has been deleted, i.e., the constant term in $x_{max}[k]$. It should be noted that, by storing in memory only the first $N_{FT}$ coefficients, the high frequency components are filtered when performing the integration. Furthermore, as can be seen from the expression of $x_{aux}[k]$, double integration is very simple to implement. This way of solving the problem of calculating the rod position as a function of time allows integrating and filtering the signal in the same step. The cutoff frequency, defined as the maximum frequency present in the processed position signal, is $$\omega_{cutoff} = \frac{2\pi}{\tau} N_{FT}.$$

In FIG. 8 a flow chart associated with step E4 is shown.

Step E5

The objective of this stage is the calculation of the downhole dynamometer card from the surface dynamometer card and the resolution of Gibbs' equation.

If the well where the device of the present invention is used is vertical, the system calculates the downhole dynamometry using a method based on a Fast Fourier Transform (FFT) algorithm.

This calculation is based on solving the Gibbs' equation in "diagnostic mode" (see for example S G Gibbs and A B Neely, *Computer Diagnosis of Down-Hole Conditions in Sucker Rod Pumping Wells*.) SPE-1165-PA, Journal of Petroleum Technology 18 (1) (1966) or T A Everitt and J W Jennings, *An Improved Finite-Difference Calculation of Downhole Dynamometer Cards for Sucker-Rod Pumps*, SPE-18189-PA, SPE Production Engineering 7 (1) (1992)). To this end, the surface boundary conditions, i.e. the position and the load on the rod, are used, and the downhole dynamometer card is calculated. Said passage from surface to downhole is performed by solving the Gibbs' equation, given by the equation below:

$$\frac{\partial^2 u}{\partial t^2} = v^2 \frac{\partial^2 u}{\partial x^2} - \gamma \frac{\partial u}{\partial t} \qquad (1)$$

Being μ the displacement, ν the speed of sound in the rod string, γ the coefficient of friction; t and x are time and position, respectively. Mathematically, it is a second order partial differential equation, associated with a dissipative wave equation.

When solving the problem in diagnostic mode, the boundary conditions correspond to measurements at the surface, in particular: i) the position of the polished rod $\mu(0,t)$=PRP($t$) for every $t$ \qquad (2)

and ii) the load measured by the dynamometer $$\frac{\partial u}{\partial x}(0, t) = PRL(t)/EA \text{ for every } t \qquad (3)$$

where PRP(t) is the position of the polished rod, A is the area of the last section of the rod string, PRL(t) is the load measured with the dynamometer and E is the Young's modulus of the rod string material. The different ways to solve this equation can be found in the literature, as for example, in "*Rod Pumping: modern methods of design, diagnosis and surveillance*", by Sam Gavin Gibbs. In the preferred embodiment of the method of the present invention, the resolution is performed using an FFT algorithm.

If the well where the device of the present invention is used is vertical, the Gibbs' equation must be modified to include the Coulomb friction terms between the string and the tubing (S. Gibbs, *Design and Diagnosis of Deviated Rod-Pumped Wells*, SPE-22787-PA (1992)). In this case, the associated equation is solved using a finite difference method.

Step E5 allows to obtain the downhole dynamometry using as input only the surface dynamometry and the detail of the underground installation.

Step E6

The objective of this step is the diagnosis of the operating status of the pump based on the evaluation of the surface and downhole dynamometer cards.

Before comparing the download cards with a standard database, a pre-processing is carried out that consists in carrying out operations on the data to organize them and/or modify them in order to facilitate their later use. This pre-processing greatly simplifies the step of comparison of cards with the standard database, decreases the number of elements and, therefore, the use of microprocessor memory and processing time. The possible operations will depend on the performance of the microprocessor to be used. Next, the most important operations will be described.

The first operation is to re-sample a card with $N_1$ points to one with $N_2$ points. In general, the measurements of the surface card are at constant time. Therefore, the spacing of the points of the downhole card in the xy plane, where in this case "x" represents the position and "y" the force, is at a constant time. This causes the agglomeration of points in the sectors where the speed is close to zero. To avoid this problem, it may be convenient to transform the card at constant segment length or arc.

Therefore, a second operation consists of transforming the card to another of a trajectory "identical" to the original, but at constant arc length.

Optionally, a third operation consists in filtering the data to smooth out the high frequency oscillations, so that they do not interfere with the subsequent operations. Typically, a Fourier filter or a variational filter can be used, in particular, a Hodrick-Prescott type filter. The filtering is not equivalent if it is done before or after bringing the card to constant arc length, since the agglomeration of points will be different. Therefore, this filtering is carried out after bringing the card to a constant arc.

A fourth operation consists of removing the inclination of the card due to tubing anchor sliding or lack of the same. It can be done by adjusting a straight line to the points on the left of the card.

In a fifth operation, the card is separated into an "upper branch" and a "lower branch", to make the comparison of each branch with a respective base. This allows decreasing the number of standard cards in the base/bases; and was described in Abello, J., A. Houang and J. Russell. (1993), *A Hierarchy of Pattern Recognition Algorithms for Diagnosis of Sucker Rod Pump Wells*, IEEE 08186-4212-2/93, pp. 359-364.

This comparison constitutes a sixth operation. Different methods can be selected to perform it. In the present application, the NN-Angular and NN-Euclidean methods will be described in detail.

Step E7

Using as a first approximation the classification calculated in the previous step E6, it is possible to calculate other parameters of interest for the production engineer.

For example, one of the most relevant parameters is the factor of pump filling, considering the net fluid displacement, which can be easily calculated by identifying a card with the presence of gas or fluid pound (G Takacs, *Sucker-Rod Pumping Handbook*, Gulf Professional Publishing, 2015).

EXAMPLE

In the following the invention will be described in even more detail in a practical embodiment of the claimed method and devices.

Processing Field Measured Data Using the Device of the Present Invention

To illustrate a method of analysis and diagnosis, as well as a device of the present invention, measurements made in well YPF-EC-1523, equipped with an SRP Lufkin 456-305-168, will be considered.

Figure 9:
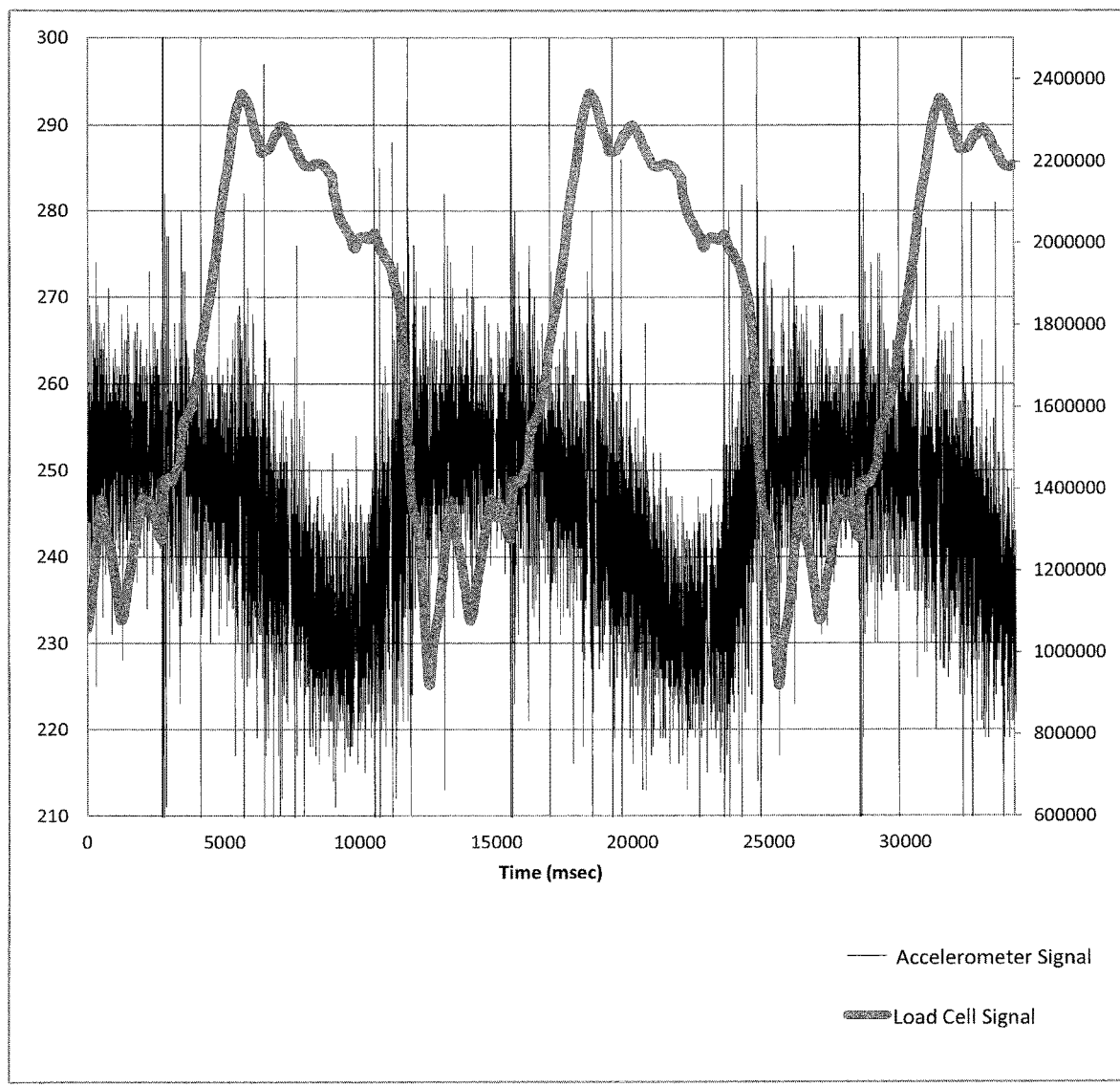
FIG. 9 shows a graphical representation of the raw measurements of sensors, load cell and accelerometer, in a field test measured with a prototype of an embodiment of the device of the present invention.

The raw signals from the sensors have a sampling frequency of approximately 640 SPS. These data are shown in FIG. 9. The load cell updates its value only at 80 SPS, but the accelerometer updates the reading in each sample.

The accelerometer presents fluctuations that are intrinsic to the sensor, as well as others coming from mechanical vibrations of the system, generated by stretching of the pumping string, to the hits it receives and to the oscillations in the assembly system, such as vibrations of the electronic board. These oscillations are of very high frequency and do not contribute to the displacement that is sought to characterize, but correspond to movements of imperceptible amplitude. However, since these oscillations are within a very high frequency spectrum zone, they contribute appreciably to the acceleration measured by the sensor. It should be noted that the effect is quadratic with frequency: for example, an oscillating component of 1 m amplitude at 1 Hz has the same acceleration associated to another component of 100 Hz with 0.1 mm amplitude.

By integrating the acceleration twice to obtain the position, these high frequency contributions disappear, because their spatial amplitude is very low and they do not contribute to the slow motion of the SRP. This can be checked by performing the acceleration integral with all the FSE coefficients or by "cutting off" the high frequency spectrum. It is observed that the result for the polished rod motion is the same. Therefore, when viewed in the Fourier space, it is only necessary to filter the low frequency modes to describe the oscillatory motion of the polished rod. These modes are responsible of the macroscopic displacement. All oscillations, string and anchor points vibrations in the housing, and even the sensor noise are filtered, eliminating the high frequency modes of the spectrum.

Figure 10:
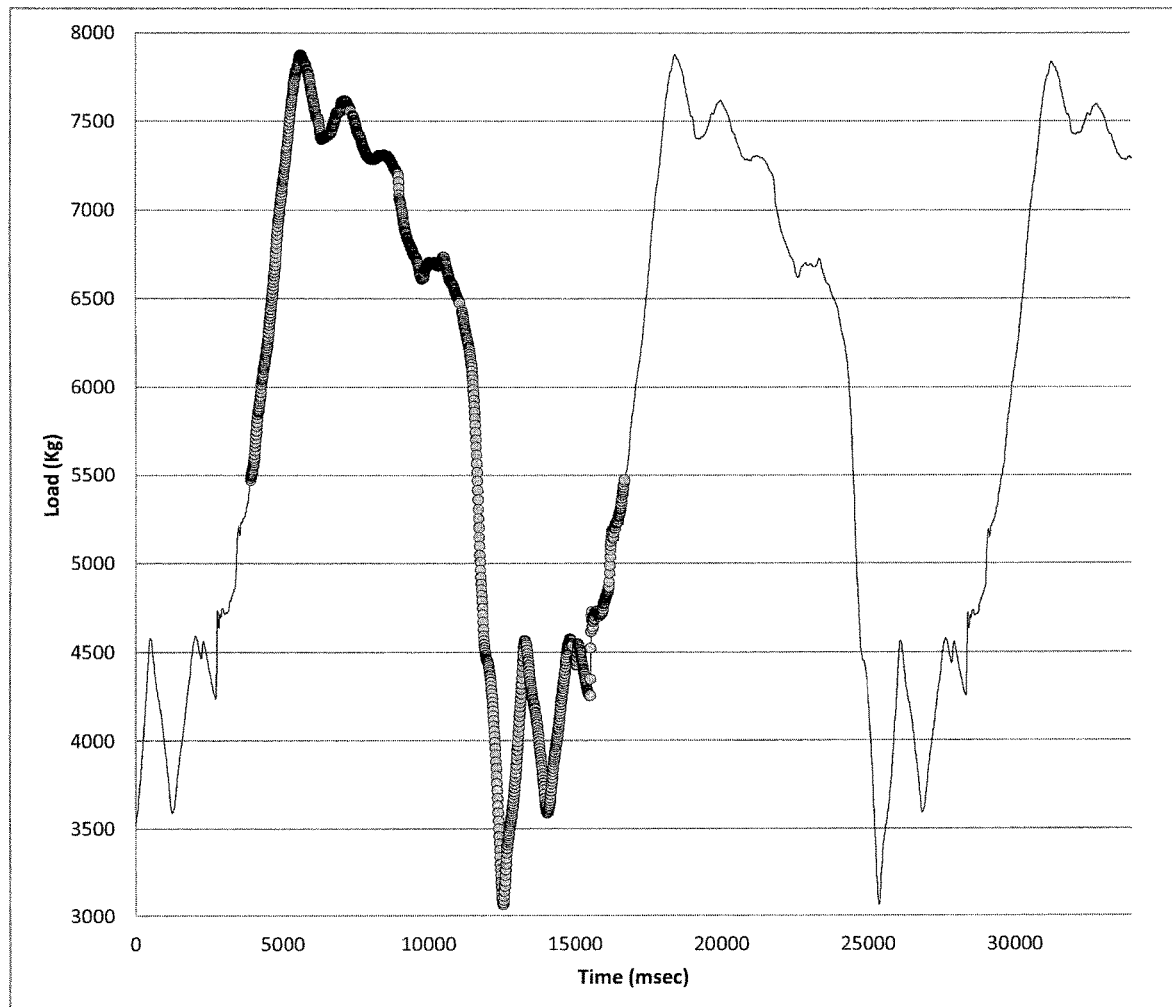
FIG. 10 shows a graphical representation obtained as a result of calculating the period from the force signal in a field test according to an embodiment of the method of the present invention.

The system first executes the steps E1 and E2 described above, which allow determining the period. When the algorithm of step E2 is applied to the data of the load cell of FIG. 9, an extract is segmented as shown in FIG. 10. From said extract a single oscillation period is obtained and the time can be calculated accurately, with a typical measurement error in the order of 12 msec.

Since the system quickly reaches the steady state, the period of the generic movement can be determined, and the FSE coefficients can be obtained "on the fly" once the oscillation period is determined.

Figure 11:
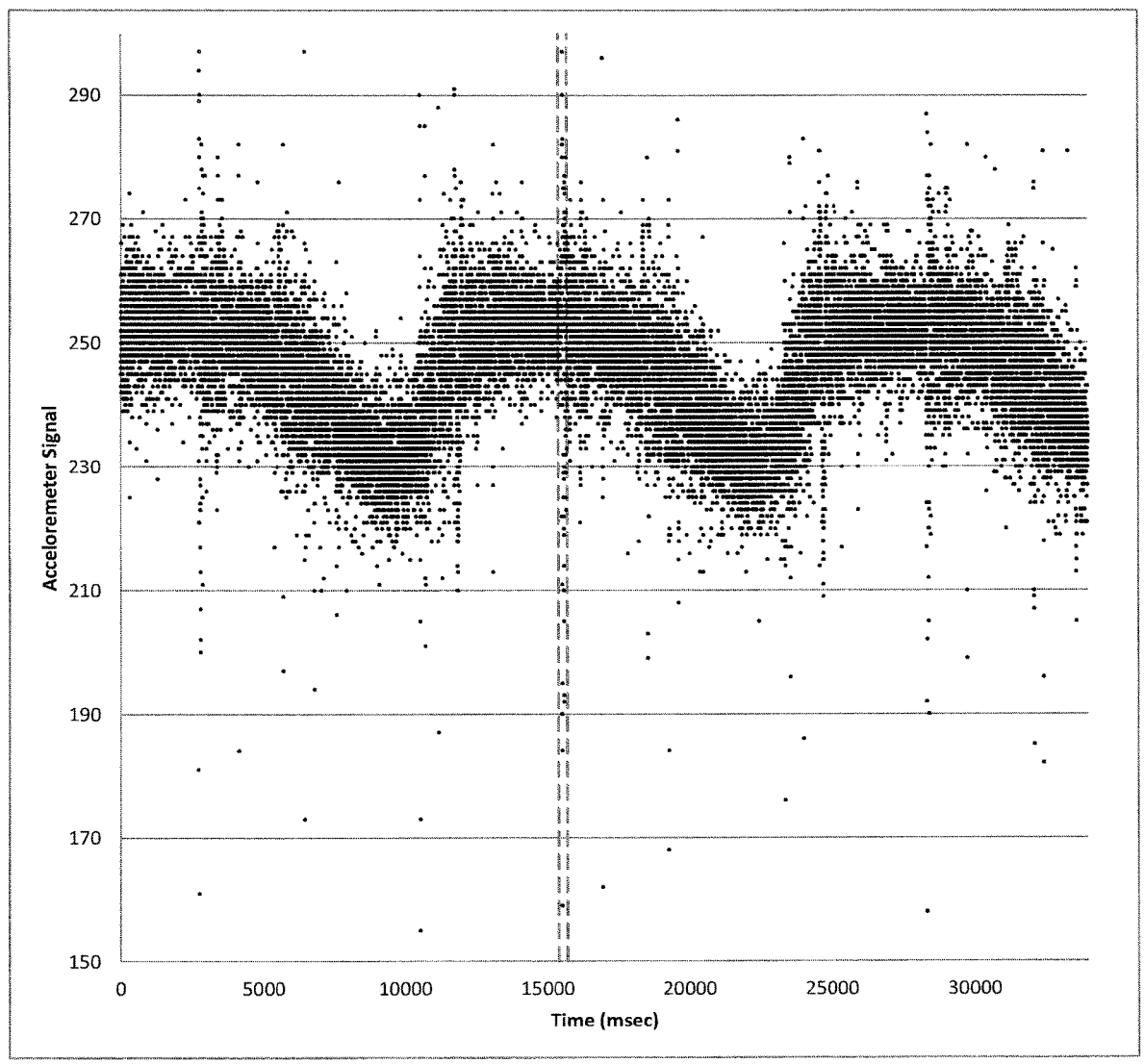
FIG. 11 shows a graphical representation of the acceleration measurement for several operation cycles in a field test according to an embodiment of the method of the present invention. Between dashed lines, a section of the data that will be analyzed in greater detail is shown.
Figure 12:
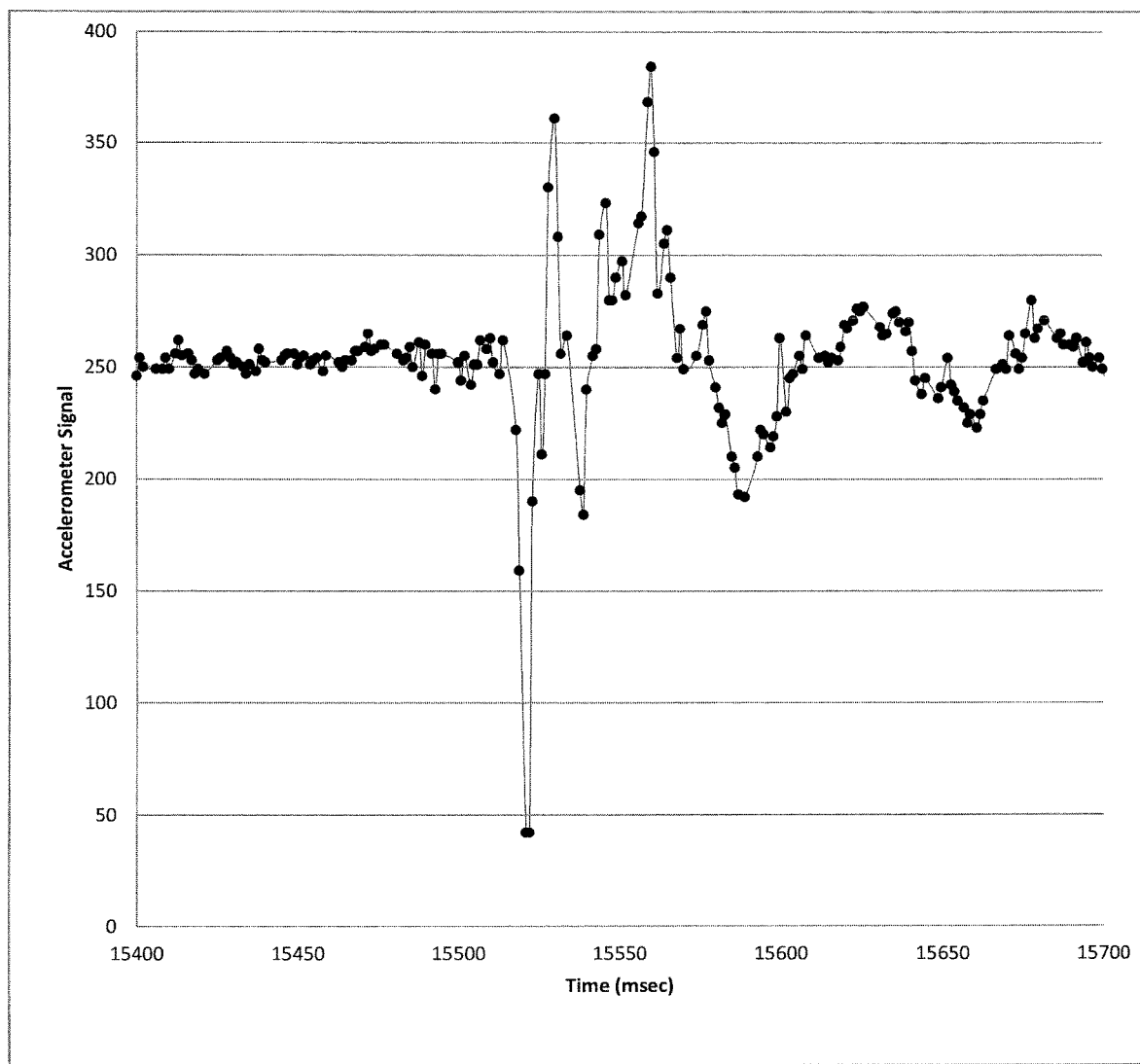
FIG. 12 shows details of the measurement with the accelerometer in the region between the dashed lines of FIG. 11.

By integrating the accelerometer signal, interpreting each partial sum of the Fourier coefficients as the discrete approximation of an integral, the high frequencies must be considered, for which the sampling must be carried out sufficiently fast. This is because rapid variations, if not taken into account in the integral of these slow modes, can induce distortions of the calculated position. FIG. 11 shows the signal of the accelerometer in counts (12 bits @ +/− 4 G range) during several cycles of the SRP by way of example. FIG. 12 shows the small interval marked with two vertical lines in FIG. 11 in an enlarged manner, to visualize the structure of the signal with the highest frequency.

The vibrations of the system generated by hitting downhole provoke great accelerations compared with those associated with macroscopic displacement. These variations are much greater than the typical fluctuations of the sensor itself and require that the measurement be made over a relatively wide range of accelerations, to avoid out-of-scale values. As can be seen in FIG. 12, the peaks associated with high frequency vibrations have a non-trivial temporal structure in tens of milliseconds scale. Therefore, greatly reducing the sampling frequency will not allow the signal to be sampled properly to characterize these vibratory processes, possibly leading to a distortion in the reconstruction of the low frequency component for the position of the SRP.

Figure 13:
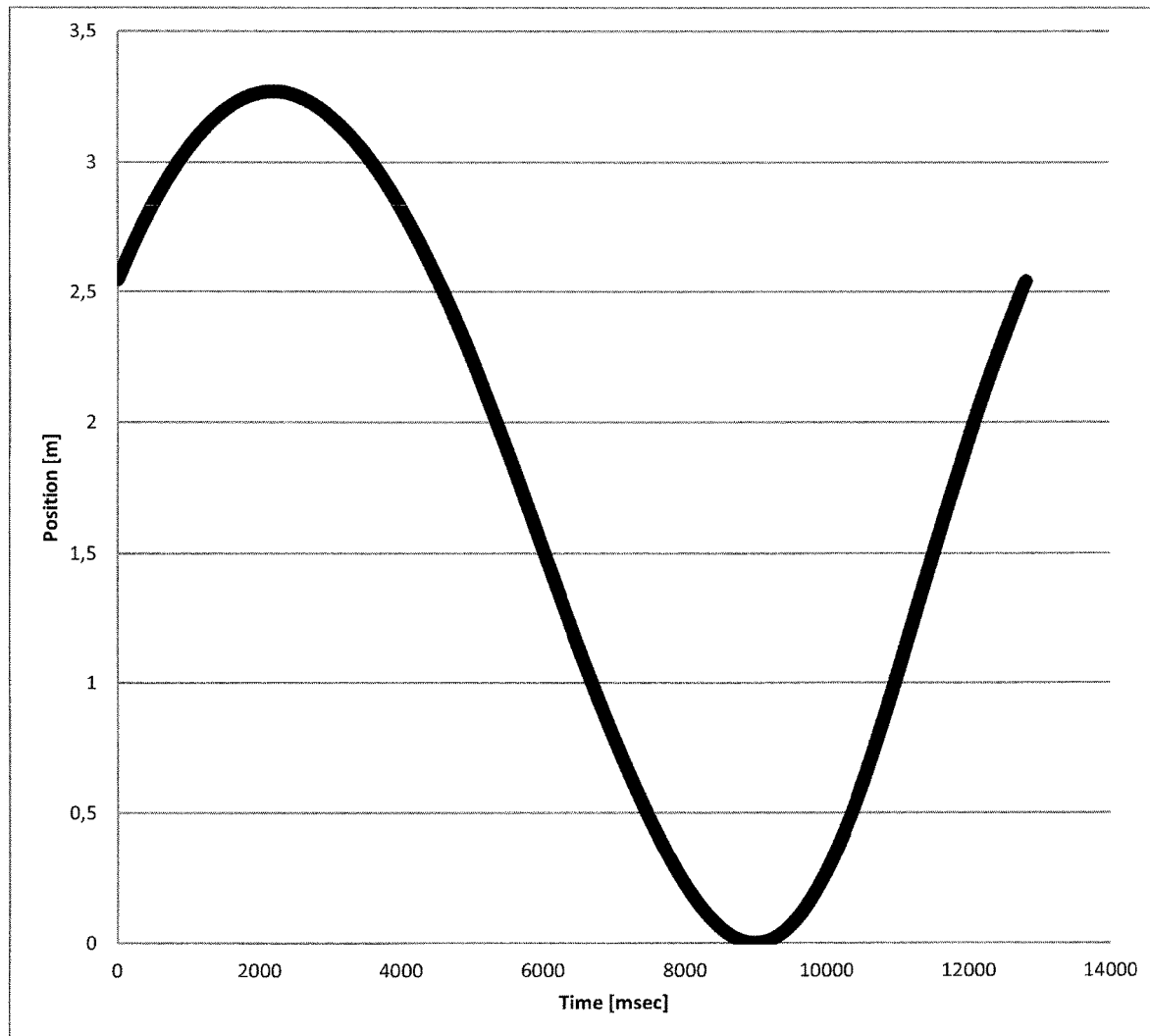
FIG. 13 shows a graphical representation of position versus time obtained from the accelerometer data according to an embodiment of the method of the present invention.

FIG. 13 shows the integrated signal, adjusted in amplitude using the SRP stroke length as the only fitting parameter. The components of frequencies associated with typical times less than 100 msec were filtered. However, the result is equivalent in case of not filtering them since, as indicated above, the integration in time strongly suppresses these high frequency modes, which correspond to very small oscillation amplitudes. In this scheme, the accelerometer offset is easily eliminated by filtering the 0-order coefficient of the FSE, which is not necessary to calculate. Therefore, the analysis method of the present invention is inherently robust: it is only necessary to know that the accelerometer readings are a linear transformation of the real acceleration. It is not necessary to use a factory calibrated device, nor it is necessary to perfectly align the accelerometer nor rigidly mounted.

The measurement was contrasted with a commercial equipment from Echometer Company, finding a typical difference of 1 cm in 3.30 m, with a maximum of 3 cm in the full cycle. The above analysis allows characterizing the rod displacement with a few Fourier coefficients if the signal is measured at a relatively high frequency. This is the scheme adopted to make the measurement on the fly. In addition, since the acquisition rate of the system is generally high for the time that it is necessary to measure, more data would be generated than those that can be stored in the microcontroller volatile memory or RAM. Since it is not possible to store all this acceleration data in the RAM, the alternatives are storing them in an SD module, or in a memory expansion that has low access latency, and then post-process or discard part of the information or possibly reduce the variables to be calculated to obtain a data on the fly, according to the present invention. Advantageously, with this modality it is not necessary to have an extension of the memory module in the device and the consumption is less, since redundancy is avoided. In this scheme, with relatively few FSE coefficients, for example 7 coefficients associated with the low frequency modes, all the information necessary to reconstruct the signal is obtained.

The first way to obtain the rod position, storing all data in an SD memory and post-processing them to calculate the position through the Fourier transform, being known the period calculated in step E2 corresponds to what was previously explained. Once the data have been obtained and stored, the steps of calculating the coefficients of stage E3 and processing of stage E4 must be followed, but with all the available data in memory. That is, the acceleration data would be stored in an array A of components A[i] and the coefficients would be calculated according to $$C_R[j] = \sum_{i=0}^{N-1} A[i]\cos\left(\frac{2\pi ij}{N}\right)$$

$$C_I[j] = \sum_{i=0}^{N-1} A[i]\sin\left(\frac{2\pi ij}{N}\right)$$

Stage E4 would be repeated without changes.

To carry out the measurement on the fly, stage E3 is performed. The system updates the value of the partial sum of the FSE coefficients as the measurements enter the system. The sum that each Fourier coefficient represents is calculated only at the end of acquiring the signal in a complete period. During the measurement, the values of the partial sums are not useful, but at the end they contain all the information necessary to reconstruct the signal. To exemplify the effect of truncating the Fourier series or decreasing the sampling frequency, the signal of the previous example was reconstructed taking different measurement and calculation strategies, determining the error that is generated in each one of them.

Figure 14:
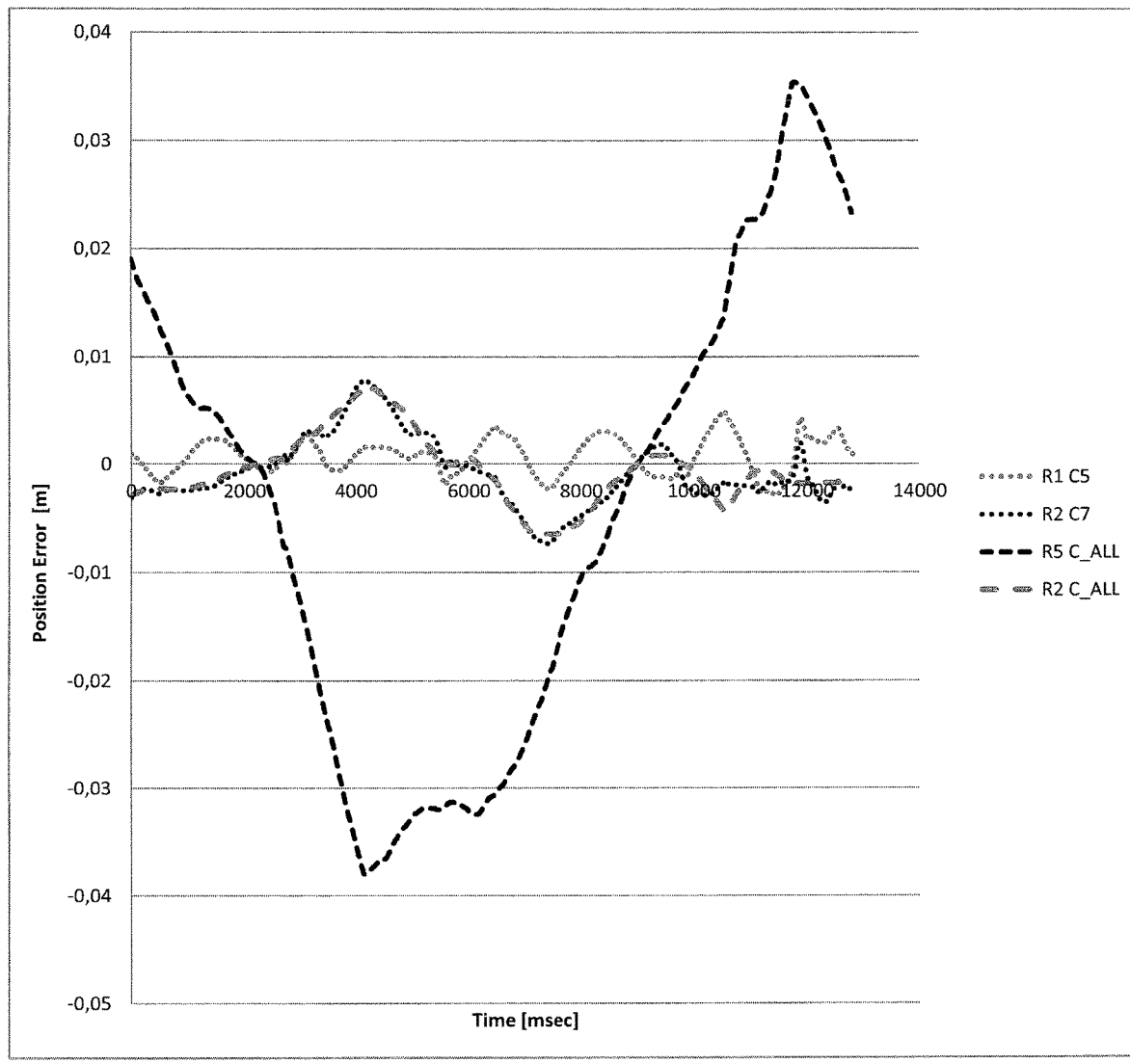
FIG. 14 shows the truncation error or loss of data in different scenarios according to an embodiment of the method of the present invention.

FIG. 14 shows the error in the calculation of the reconstruction of the position of the SRP polished rod as a function of time for different sampling schemes and quantity of harmonics. The curves are classified as R#C %, where R# indicates that "#-1" of # data was removed. C % indicates that the Fourier series is truncated at the coefficient %, where the symbols # and % represent only positive integers. Those associated with negative frequencies are included, and it is used the symmetry associated that the signal is real. The original signal is measured at 640 SPS. The curve R1C5 indicates that data have not been removed but only 5 Fourier coefficients are calculated and stored in memory. In this case the error does not exceed 1 cm in 3.3 m. R2C7 and R2C_ALL indicate that 1 out of 2 data could be removed obtaining a similar performance using 7 or all the Fourier coefficients of the original signal. This means that adding the high frequency terms of the series does not provide new information, since C7 and C_ALL have basically the same error. The error however is amplified to 1 percent when 4 out of 5 data are removed as in R5C_ALL. The impact of eliminating data is very large, and although the acquisition frequency is high compared to the macro movement of the rod of around 4.7 strokes per minute, eliminating points in the signal generates a bias in the estimation of the low frequency coefficients. Comparing the curves R2C7 and R2C_ALL in FIG. 14, it can be seen that with 7 Fourier coefficients, error is hardly introduced by truncation of the transform. That is, a measurement with 7 Fourier coefficients at 320 Hz would be enough to characterize the position with an error no larger than 1 cm in 3.30 m.

In general, the truncation error can be calculated a priori by knowing the geometry of the SRP. Using the Lufkin datasheets and using as a first approximation that the angular velocity of the crank is constant, the resulting displacement of the rod can be expanded in Fourier series and the truncation error can be evaluated by retaining only 7 Fourier coefficients to describe this time series. By performing this exercise, it can easily be seen that limiting the sum to 7 Fourier coefficients yields to an error of less than 3 parts in 10,000 in the reconstruction of the polished rod position for most commercial models. Therefore, the truncation error can be neglected under conditions of practical interest.

The general strategy derived from the example is: acquire data as quickly as possible, calculating simultaneously all the Fourier coefficients, totalizing at least 5 for a safe margin, or 7 to be able to guarantee that the truncation error is negligible. That is to say, in this measurement scheme it is sought to maximize the SPS of the accelerometer.

Taking into account the above, a functional prototype was built capable of calculating 7 Fourier coefficients at a 500 SPS sampling with the same electronic components that are described in the preferred embodiment of the invention. The profiling of an "on the fly" measurement for an Atmel SAM3X8E ARM Cortex-M3 microcontroller used in this embodiment can be seen in FIG. 15, which shows the times, in microseconds, associated with each task in the sampling and calculation "on the fly" during an oscillation period.

In the calculation loop, 7 Fourier coefficients in real and imaginary part are accumulated. Because the transform corresponds to a real signal, the conjugates are other 7 complex numbers that do not need to be stored, since they can be obtained by simple conjugation of the first ones. Compared to FIGS. 11 and 12, data is practically not discarded since the complete scheme runs at 500 SPS. Thus, the performance in acquisition and truncation is better than R2C7. In order to guarantee that the sampling times correspond to a regular grid, it is necessary to pause the sampling in order to synchronize the measurement with this time grid.

As shown in FIG. 15, a time interval is specified, denoted by "Synchro Wait", of possibly variable length that allows the system to enter standby mode until the microcontroller clock reaches the next grid point. In this example, this time is approximately 450 pec. The value gives an appreciable margin to synchronize with the grid in case there are variations of time in the other intervals where the tasks designated by "Accelerometer Measurement", "Load Measurement" and "Accum. Fourier Coef." are executed. These variations can be generated due to small variations in the components with which the equipment is assembled, which generally have random variations when leaving the manufacturing line. Even exactly equivalent components could have small shifts due to temperature. The value specified in the example for the spacing of the temporary grid (2 msec corresponding to 500 SPS) allows having a typical margin for "Synchro Wait" of 450 pec, which is sufficient to compensate for any of these effects. An exhaustive characterization of the equipment would allow to diminish this time to take more samples. This could be done, for example, in a pre-measurement stage, by executing an automatic time profiling, decreasing the synchronization interval as much as possible Finally, with the obtained data a surface dynamometer card is generated, representing the force as a function of the position with time as a parameter, as shown in FIG. 16.

Next, the further processing of the obtained surface card is described. Said processing can be applied to any other way of obtaining the surface card, such as by changing the acceleration transducer by one of position or by combining the method described below with another device capable of measuring the surface dynamometer card.

Once the cyclic operation condition is accepted, the surface data is used to calculate the downhole card. Said step from surface to downhole, is done by solving the Gibbs' equation in step E5, as explained above. The downhole card calculated from the surface card is shown in FIG. 17.

Once having the downhole dynamometer card, one proceeds to its pre-processing and subsequent comparison with standard cards and diagnosis as explained above for step E6. Next, these processes of step E6 are exemplified.

Card Pre-Processing

To exemplify the processing, the card shown in FIG. 17 will be used, and it will be detailed how this card is modified during the analysis.

Figure 18B:
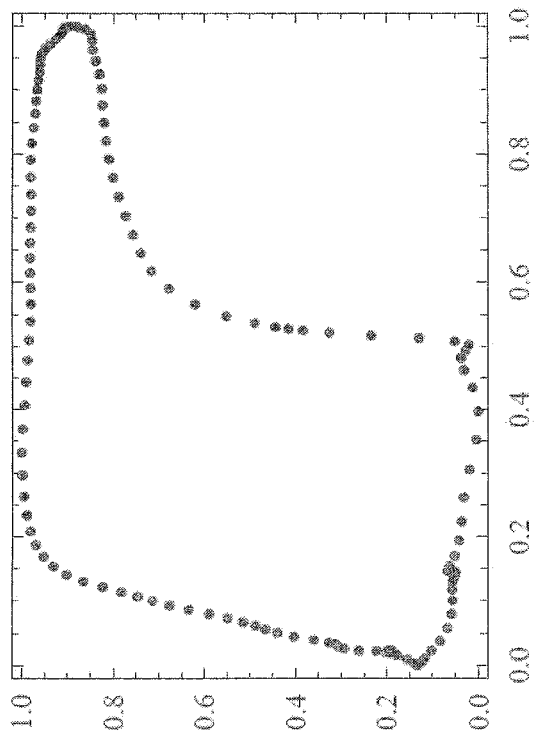
Figure 18A:
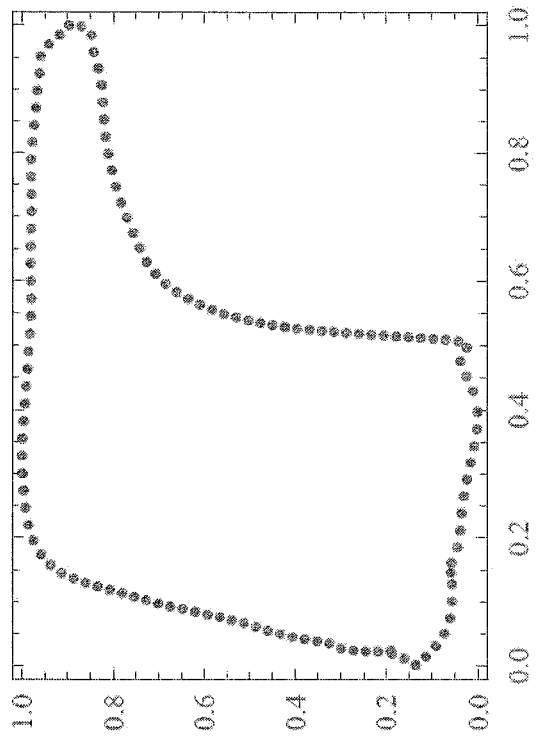

As mentioned above, the first pre-processing operation consists of re-sampling a card with N1 points to one with N2 points, to allow static memory allocation. For this work, N2=256 points was chosen, and this will be the number of points that will be used in all subsequent steps. To compare the cards by form, it is convenient to normalize them to the same interval. The interval [0, 1] was selected. FIG. 18A shows the normalized and re-sampled card at 256 points.

As indicated above, in general the measurements of the surface card points are made with constant time sampling, producing agglomeration of points in the sectors where the velocity is close to zero. The second operation of the pre-processing consists of transforming the card to constant arc length. This is done by linearly interpolating in the original card. FIG. 18B illustrates the card with the equispaced points.

Figure 18C:
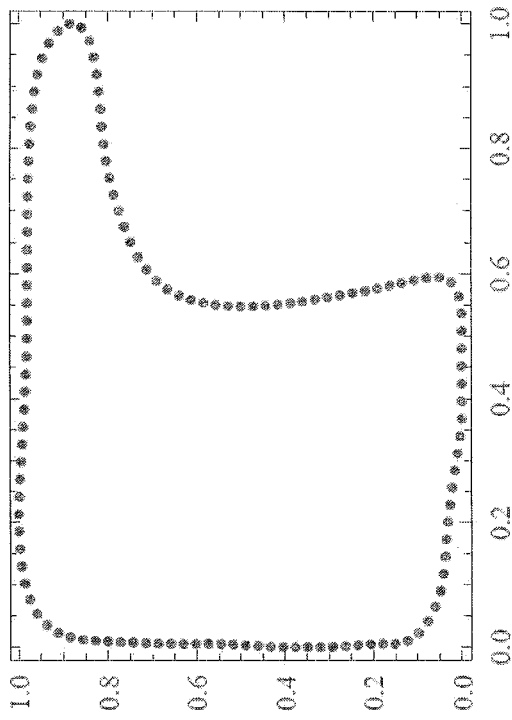

To smooth the high frequency oscillations and in order not to interfere with subsequent operations, a variational filter is used in the third operation. In particular, a Hodrick-Prescott type filter is used. The cards resulting from the filter application to the series are shown in FIG. 18C.

Figure 18D:
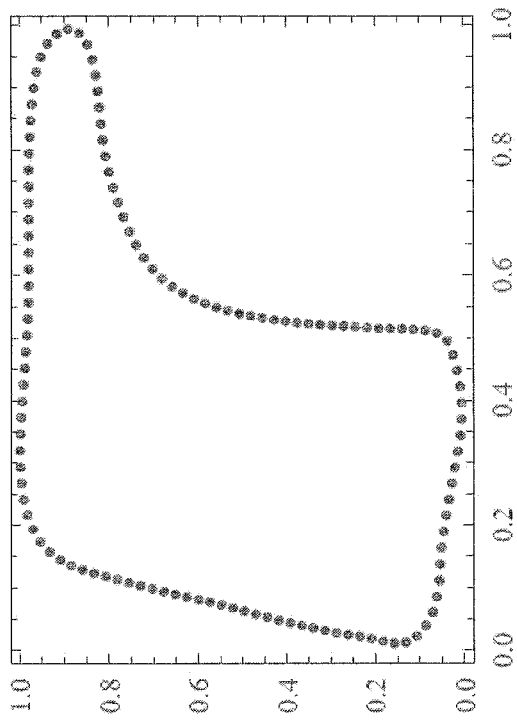

The fourth operation consists of determining if the card has an inclination due to a tubing without an anchor or with some problem in the anchor. In this operation, the inclination of the card due to the sliding of the tubing anchor or the absence thereof is sought to be eliminated. First, a straight line is set at the points on the left of the card to calculate the inclination angle. Then, the points are moved in the x direction, according to their height in y, using the slope of the fitted straight line. This process changes the extension of the card in the x direction, and therefore, the letter must be normalized, taking it back to the interval [0, 1] in the x axis. FIG. 18D shows the letter straightened and rescaled.

As indicated above, the diagnosis is made by branch of the card, so it is necessary to segment the card in its lower and upper branches. For this, in the fifth operation, the card is separated in said upper and lower branches. First the points with x extremes must be identified, i.e., the point that has the minimum value in x and the point with the maximum value in x. Then, the points of the card corresponding to the counterclockwise running thereof are taken from the maximum to the minimum, this allows taking the upper branch associated with the ascending stroke of the pump. For the analysis by branch, the lower part is completed with the "square" card: said ends are linked by vertical and horizontal segments, which would correspond to "completing" the upper branch with a "neutral" or "no failures" card in the bottom part. The resulting card is called the upper branch, like the one shown in FIG. 19A. With the same procedure, but running clockwise from maximum to minimum, the lower branch associated with the descending stroke is extracted. An example of this extraction is presented in FIG. 19B.

Card Comparison—Global Characterization

The pre-processed and segmented downhole card in its upper and lower branches is now compared with a limited database to find the nearest neighbor using an NN ("nearest neighbor") method that allows classifying the global behavior.

To reduce the number of comparisons, scalar descriptors can be used to discard cases of incompatibility. In this particular case, the area of the card is selected to reduce the search space. Specifically, in the implementation the area of the target card is calculated, that is, the processed card or the one corresponding to the upper branch and the lower branch, and that scalar parameter is compared in order to admit an element of the base as NN. If the target card has an area close to the base, then the calculation of detail or the comparison between both elements is accepted. Otherwise, the case is discarded and the next one is continued. The comparison between cards can be made between the full downhole card and a database for the downhole card, or the upper branch of the downhole card and a database for the upper branch, or the lower branch of the downhole card and a database for the lower branch. The database for the upper branch, in general, contains much fewer cards than the base for the lower branch. Below are two of the comparison methods that can be used, without limiting the comparison methods to those described below.

NN-Angular Method

In this method, two contiguous points are taken on the standardized dynamometer card. For example, the point $(x, y)_i$ and the point $(x, y)_{i+1}$. The vector determined by those contiguous points in the direction of increasing time is defined, that is, the vector originates at point i, and ends at point i+1. The series of angles of all the vectors thus defined is constructed, as shown in FIGS. 20A and 20B.

In this way, the two-dimensional problem is transformed into a one-dimensional problem, with an expected but slight loss of information.

The series of angles constructed in this way is compared against a well-known and synthetically created database. FIGS. 21A and 21B show the angular series and the synthetic standard series with less distance for the upper and lower branches, respectively, for the card analyzed by way of example.

NN-Euclidean Method

This method presents a more robust alternative to the NN-angular method. The comparison in this case is of Euclidean proximity point to point, so it is tolerant to noise, such as "loops" or high frequency noise. The disadvantage with respect to the previous method is the greater calculation time and larger size in the database due to its two-dimensional character. In this method, the distance between the target and an element of the base is defined as the sum of the Euclidean distances between each point of the target and the closest point to the polygonal approximation of the element of the base at issue. FIG. 22 illustrates the principle of comparison of the method.

The method scans all the points of the target card, and determines for each of them the two closest points in the current standarized card. For these closest points, the straight line that links them is constructed and the distance from the target point to said straight line is calculated. This distance is added to the previous one, and the process is continued for all the points. At the end of scanning all the points, the accumulator contains the sum of all the distances between the target card and the closest point of the standarized card in its polygonal version.

It should be noted that, because the method takes the distance perpendicular to the nearest straight line, the standarized card does not need to have equispaced points and only the most representative points can be used, without the need for a high number of points.

This method admits two immediate improvements to accelerate the search process of points near a target point. The standard cards are stored in an orderly manner, so it is not necessary to scan all points of a given base card, but only in a surrounding of the approximate position of the point. On the other hand, the method comprehensively compares the target card with all the base cards that have not been discarded for having an area outside a predefined threshold. Then, since the proximity relationship is evaluated through a distance accumulated in a calculation loop, it is possible to cut the individual comparisons early. If the distance accumulated in the partial sum in a certain step of the loop (partial sum) has already exceeded the value of the current minimum distance detected in the previous cards, the comparison against that card in the base can be aborted, since the complete calculation will always exceed the previously detected minimum.

For the data used in this example, which has as a downhole card of FIG. 16, both NN-Angular and NN-Euclidean methods provide, as the closest neighbor, the card to which the diagnosis "fluid blow" is assigned.

We claim:

1. A method to perform measurements, diagnose operation, evaluate the performance and generate alarms, in a pumping system of an oil well comprising a pumping polished rod linked to a reciprocating unit, wherein the method comprises the following steps:
   a) determining an operating characteristic of the pumping system at the surface;
   b) determining said operating characteristic of the pumping system downhole based on the operating characteristic of the pumping system at the surface; and
   c) obtaining an operation diagnosis of the pumping system based on the characteristics of the pumping system at the surface and downhole,
   wherein step a) of determining an operating characteristic of the pumping system at the surface comprises the steps of:
   aa) determining at least one force cycle on the polished rod;
   ab) determining the polished rod oscillation period based on the force cycle determined in aa); and
   ac) determining the polished rod position as a function of time by the following steps:
   i) obtaining a polished rod acceleration signal and simultaneously obtaining a Fourier transform of the polished rod acceleration signal, from the time domain to the frequency domain, with at least a first order coefficient of the Fourier transform series expansion of the transformed signal of the polished rod acceleration from said acceleration signal and the polished rod oscillation period determined in step ab);
   ii) dividing Fourier coefficient(s) determined in i) by the square of its/their index, which is equivalent to integrating twice the acceleration signal in the time domain, and obtaining a new transformed signal proportional to a position transform; and
   iii) anti-transforming the new transformed signal obtained in ii) and obtaining the position of the polished rod as a function of time,
   wherein in step ac) i), said acceleration signal is produced by an accelerometer and the calculation of the coefficient(s) of the expansion is performed for each acceleration value obtained from said acceleration signal and the calculation of the zero-order coefficient is omitted in the Fourier transform series expansion of the transformed signal of the polished rod acceleration.

2. The method according to claim 1, wherein the Fourier coefficient(s) of acceleration and position are obtained in step ac) i) based on the polished rod acceleration signal and simultaneous obtaining of the Fourier transform, from the time domain to the frequency domain, of the polished rod acceleration signal, with at least the first order coefficient of the Fourier series expansion of the transformed signal of the rod acceleration from said acceleration signal and the rod oscillation period determined in step ab).

3. The method of claim 2, wherein in step ac) i) between 5 and 7 coefficients of Fourier series expansion are used.

4. The method of claim 3, wherein in step ac) i) 7 coefficients of Fourier series expansion are used.

5. The method according to claim 1, wherein the operating characteristic is a dynamometer card.

6. The method according to claim 1, wherein the position of the polished rod as a function of time is rescaled with the stroke thereof.

7. A device for diagnosing the operation of a pumping system of an oil well comprising pumping polished rod linked to a reciprocating unit, wherein said device comprises, in a single housing or enclosure, at least one data acquisition unit, at least one power source and at least one processing unit, wherein said processing unit:
 a) determines a dynamometer card of the pumping system at the surface;
 b) determines a dynamometer card of the pumping system downhole based on the dynamometer card of the pumping system at the surface; and
 c) obtains a diagnosis of operation of the pumping system based on the dynamometer cards of the pumping system at the surface and downhole;
wherein to determine a dynamometer card of the pumping system at the surface the processing unit:
 aa) determines at least one force cycle on the polished rod;
 ab) determines the oscillation period of the polished rod from the force cycle determined in aa); and
 ac) determines the position of the polished rod as a function of time, by the following steps:
 i) obtaining a polished rod acceleration signal and simultaneously obtaining a Fourier transform of the polished rod acceleration signal, from the time domain to the frequency domain, with at least a first order coefficient of the Fourier series expansion of the transformed signal of the rod acceleration from said acceleration signal and the oscillation period of the rod determined in step ab);
 ii) dividing Fourier coefficient(s) determined in i) by the square of its/their index, which is equivalent to integrating twice the acceleration signal in the time domain, and obtaining a new transformed signal proportional to a transform of the position; and
 iii) anti-transforming the new transformed signal obtained in ii) and obtaining the polished rod position as a function of time, wherein in step ac) i) said acceleration signal is produced by an accelerometer and the calculation of the coefficient(s) of the expansion is performed for each acceleration value obtained from said acceleration signal and the calculation of the zero-order coefficient is omitted in the Fourier transform series expansion of the transformed signal of the polished rod acceleration.

8. The device of claim 7, wherein the power source is selected from the group comprising non-rechargeable batteries, rechargeable batteries by solar panels and ultracapacitors with solar panels, piezoelectric generators or a wired power from an external power source.

9. The device according to claim 8, wherein the device uses 7 coefficients of the Fourier series expansion.

10. The device according to claim 7, wherein the device uses between 5 and 7 coefficients of the Fourier series expansion.

11. The device according to claim 7, wherein the data acquisition unit comprises a force transducer or load cell.

12. The device according to claim 7, wherein the data acquisition unit comprises a position transducer.

13. The device according to claim 7, wherein said device further comprises a unit for wireless transmission of data to a remote unit.

* * * * *